US012541251B2

United States Patent
Choi et al.

(10) Patent No.: US 12,541,251 B2
(45) Date of Patent: Feb. 3, 2026

(54) WEARABLE DEVICE AND METHOD FOR IDENTIFYING LOCATION OF TARGET OBJECT

(71) Applicant: SAMSUNG ELECTRONICS CO., LTD., Suwon-si (KR)

(72) Inventors: Sungsoo Choi, Suwon-si (KR); Sungoh Kim, Suwon-si (KR); Donghyun Yeom, Suwon-si (KR); Beomsu Kim, Suwon-si (KR); Boyoung Lee, Suwon-si (KR); Sanghun Lee, Suwon-si (KR); Hyojin Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/747,408

(22) Filed: Jun. 18, 2024

(65) Prior Publication Data

US 2025/0068235 A1 Feb. 27, 2025

Related U.S. Application Data

(63) Continuation of application No. PCT/KR2024/007519, filed on May 31, 2024.

(30) Foreign Application Priority Data

Aug. 25, 2023 (KR) .................. 10-2023-0112337
Sep. 20, 2023 (KR) .................. 10-2023-0125962

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/0101* (2013.01);
(Continued)

(58) Field of Classification Search
CPC . G06F 3/013; G02B 27/0093; G02B 27/0101; G02B 27/017; G02B 2027/0138;
(Continued)

(56) References Cited

U.S. PATENT DOCUMENTS 9,734,402 B2 8/2017 Jang et al.
10,152,495 B2 12/2018 Rahman et al.
(Continued)

FOREIGN PATENT DOCUMENTS

KR 102209511 B1 1/2021
KR 20220037996 A 3/2022
(Continued)

OTHER PUBLICATIONS

International Search Report and Written Opinion corresponding to Application No. PCT/KR2024/007519; Dated Sep. 19, 2024.

*Primary Examiner* — Stephen G Sherman
(74) *Attorney, Agent, or Firm* — CANTOR COLBURN LLP

(57) ABSTRACT

A wearable device includes a display, one or more cameras, and at least one processor configured to identify information on a target object and a visual object related to an external object corresponding to the target object in at least one image. The at least one processor is configured to identify whether a first image including the visual object is displayed through the display. The at least one processor is configured to change the first image to emphasize the visual object, based on identifying that the first image including the visual object is displayed through the display. The at least one processor is configured to display an affordance for chang- (Continued)

ing the gaze of the user to display the first image by overlapping the second image, based on identifying that a second image, which is distinct from the first image including the visual object, is displayed through the display.

19 Claims, 16 Drawing Sheets

(51) Int. Cl.
  *G02B 27/01* (2006.01)
  *G06V 20/20* (2022.01)
  *G06V 20/64* (2022.01)
(52) U.S. Cl.
  CPC ........... *G02B 27/017* (2013.01); *G06V 20/20* (2022.01); *G06V 20/64* (2022.01); *G02B 2027/0138* (2013.01); *G02B 2027/014* (2013.01); *G02B 2027/0178* (2013.01); *G06V 2201/07* (2022.01)
(58) Field of Classification Search
  CPC ...... G02B 2027/014; G02B 2027/0178; G06V 20/20; G06V 20/64; G06V 2201/07
  See application file for complete search history.

(56) References Cited

U.S. PATENT DOCUMENTS

| | | |
|---|---|---|
| 10,489,981 B2 | 11/2019 | Fukazawa et al. |
| 10,585,939 B2 | 3/2020 | Calcaterra et al. |
| 11,189,059 B2 | 11/2021 | Schmuck et al. |
| 11,282,133 B2 | 3/2022 | Greenberger et al. |
| 11,398,089 B1 | 7/2022 | Jindal et al. |
| 12,045,278 B2 | 7/2024 | Barros et al. |
| 2015/0227778 A1* | 8/2015 | Cervantes .............. H04N 23/57 348/47 |
| 2017/0103124 A1 | 4/2017 | Hassan |
| 2019/0089898 A1* | 3/2019 | Kim ....................... G06V 10/82 |
| 2019/0141312 A1* | 5/2019 | Swope .................. G06F 3/0304 |
| 2021/0035533 A1* | 2/2021 | Tanaka ................... G09G 3/003 |
| 2021/0150746 A1* | 5/2021 | Kang .................... G06V 10/764 |
| 2022/0205803 A1 | 6/2022 | Karunianto et al. |
| 2022/0414146 A1 | 12/2022 | Osotio et al. |
| 2024/0077942 A1 | 3/2024 | Saito |

FOREIGN PATENT DOCUMENTS

| | | |
|---|---|---|
| KR | 20220094092 A | 7/2022 |
| KR | 20230088436 A | 6/2023 |
| WO | 2023022987 A1 | 2/2023 |

* cited by examiner

WEARABLE DEVICE AND METHOD FOR IDENTIFYING LOCATION OF TARGET OBJECT

CROSS-REFERENCE TO RELATED APPLICATIONS

This application is a continuation of International Application No. PCT/KR 2024/007519 designating the United States, filed on May 31, 2024, in the Korean Intellectual Property Receiving Office and claiming priority to Korean Patent Application Nos. 10-2023-0112337, filed on Aug. 25, 2023, and 10-2023-0125962, filed on Sep. 20, 2023, in the Korean Intellectual Property Office, the disclosures of each of which are incorporated by reference herein in their entireties.

BACKGROUND

Technical Field

The following description relates to a wearable device and a method for identifying a location of a target object.

Description of Related Art

In order to provide an enhanced user experience, an electronic device providing an augmented reality (AR) service and/or a virtual reality (VR), can display information generated by a computer in association with an external object within the real-world. The electronic device may be a wearable device that may be worn by a user. For example, the electronic device may be AR glasses and/or a head-mounted device (HMD).

The above-described information may be provided as related art for the purpose of helping to understand the present disclosure. No claim or determination is raised as to whether any of the above-described information may be applied as prior art related to the present disclosure.

SUMMARY

According to an embodiment, a wearable device may include a display, one or more cameras, memory including one or more storage mediums storing instructions, and at least one processor comprising processing circuitry. The instructions, when being executed by the at least one processor individually or collectively, may cause the wearable device to identify information on a target object. The instructions, when being executed by the at least one processor individually or collectively, may cause the wearable device to identify a visual object related to an external object corresponding to the target object in at least one image acquired by the one or more cameras and obtained based on a gaze of a user of the wearable device during a designated time interval. The instructions, when being executed by the at least one processor individually or collectively, may cause the wearable device to identify whether a first image including the visual object is displayed through the display based on the gaze of the user. The instructions, when being executed by the at least one processor individually or collectively, may cause the wearable device to change the first image to emphasize the visual object, based on identifying that the first image including the visual object is displayed through the display. The instructions, when being executed by the at least one processor individually or collectively, may cause the wearable device to display an affordance for changing the gaze of the user to display the first image by overlapping the second image, based on identifying that a second image, which is distinct from the first image including the visual object, is displayed through the display.

According to an embodiment, a method of a wearable device may comprise identifying information on a target object, identifying a visual object related to an external object corresponding to the target object in at least one image obtained based on a gaze of a user of the wearable device during a designated time interval. The method may comprise identifying whether a first image including the visual object is displayed through a display of the wearable device based on the gaze of the user. The method may comprise, based on identifying that the first image including the visual object is displayed through the display, changing the first image to emphasize the visual object. The method may comprise, based on identifying that a second image, which is distinct from the first image including the visual object, is displayed through the display, displaying an affordance for changing the gaze of the user to display the first image by overlapping the second image.

According to an embodiment, a method of a wearable device may include identifying information on a target object and requesting identification of a visual object related to the target object to an external wearable device connected to the wearable device. The method may include receiving information on the visual object identified through the external wearable device based on the request and based on the information on the visual object, displaying an element for indicating a location of the external object on a display of the wearable device.

DETAILED DESCRIPTION

Figure 1:
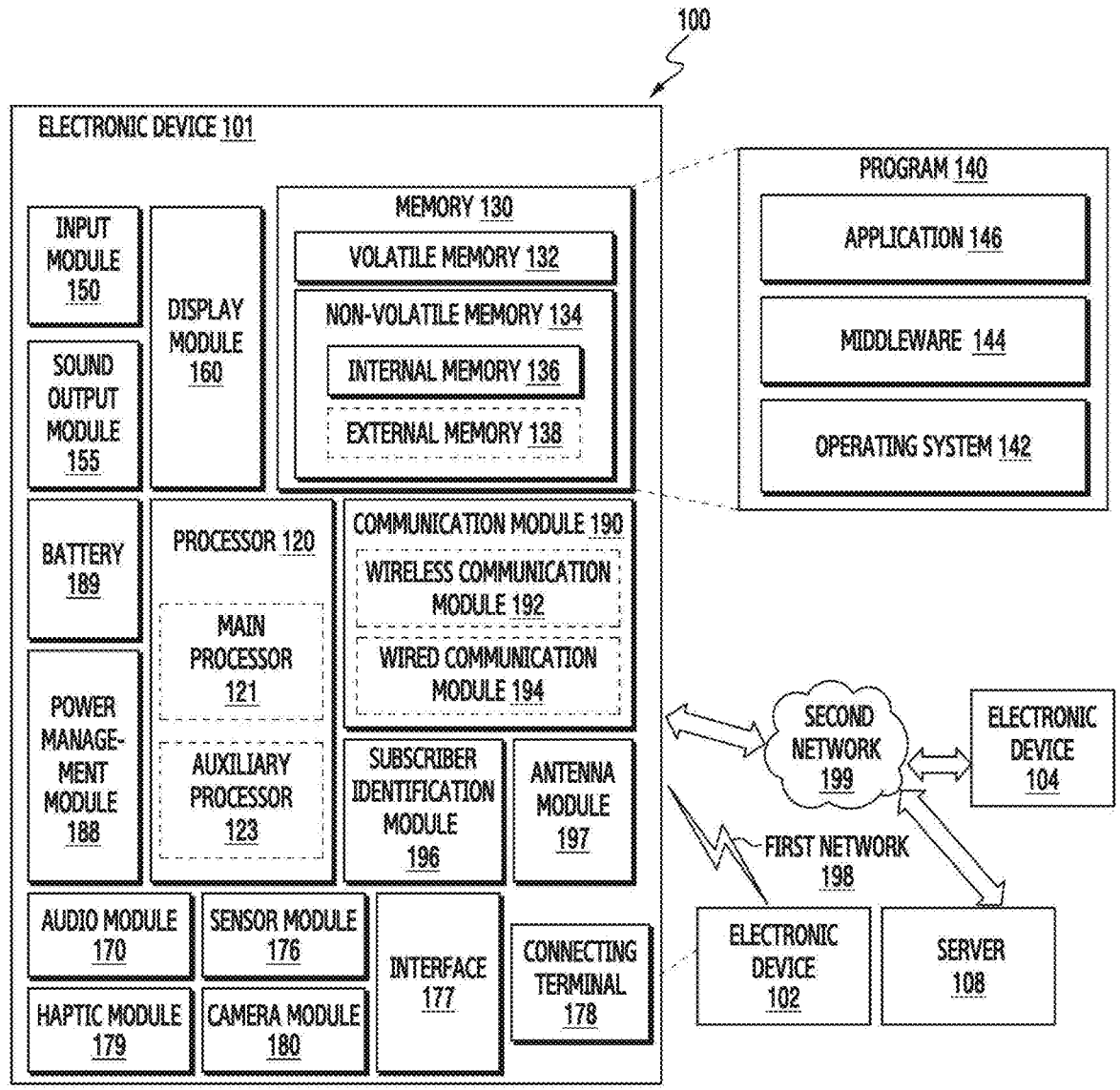
FIG. 1 is a block diagram of an electronic device in a network environment, according to an embodiment.

Hereinafter, embodiments of the present disclosure will be described in detail with reference to drawings so that those having ordinary knowledge in the art to which the present disclosure belongs may easily implement it. However, the present disclosure may be implemented in various different forms and is not limited to the embodiments described herein. In relation to the description of the drawings, identical or similar reference numerals may be used for identical or similar components. In addition, in the drawings and related descriptions, descriptions of well-known features and configurations may be omitted for clarity and brevity.

FIG. 1 is a block diagram of an electronic device in a network environment, according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101.

The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
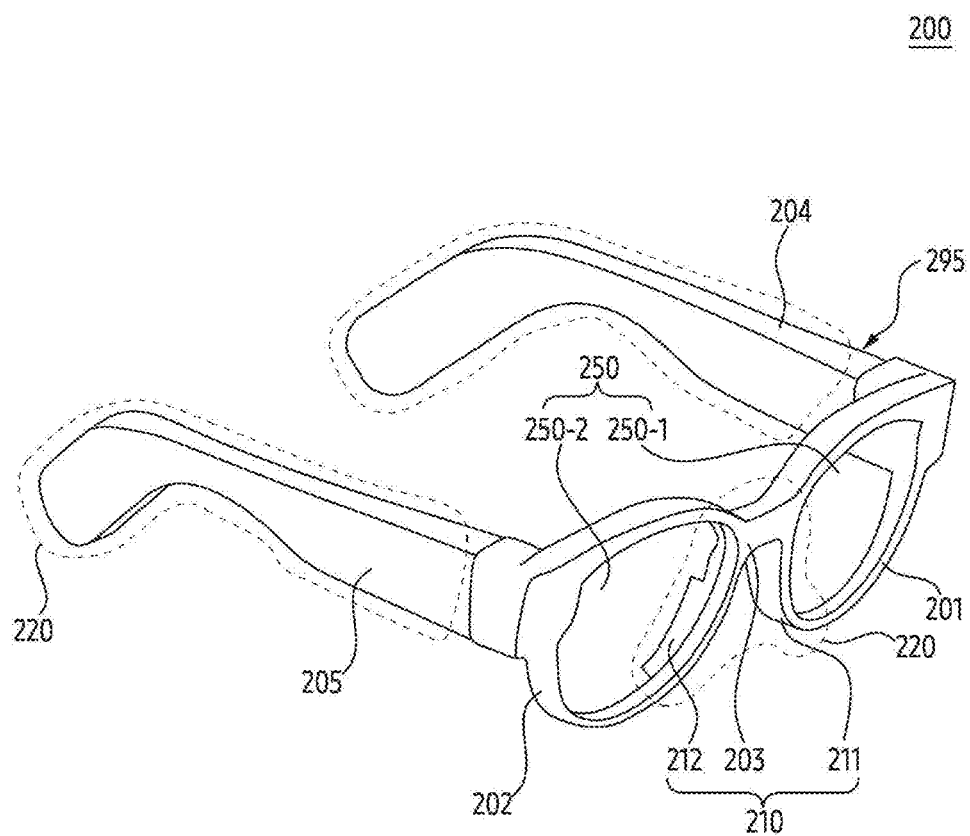
FIGS. 2A and 2B illustrate an example of a perspective view of a wearable device, according to an embodiment.
Figure 2B:
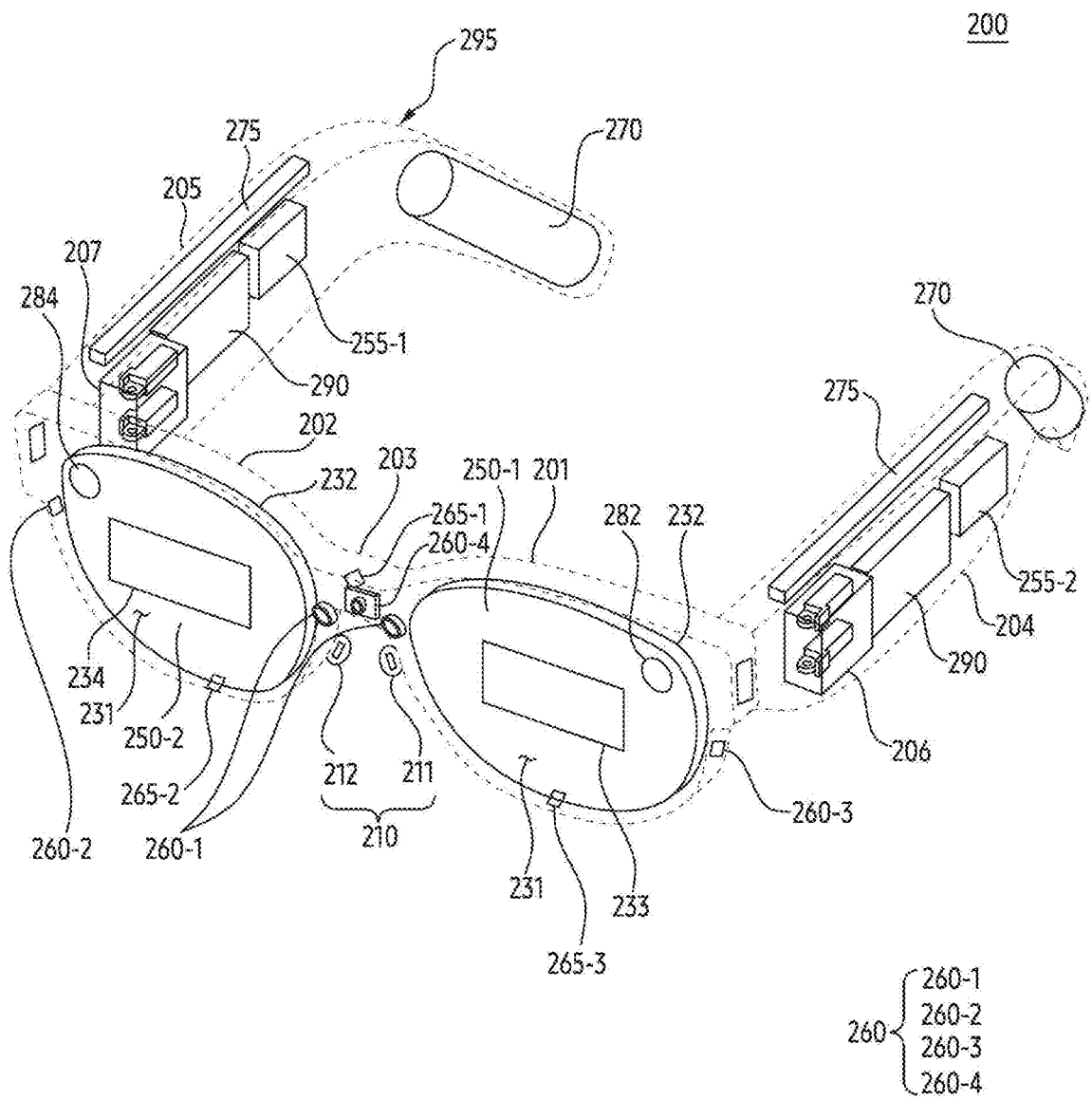

FIGS. 2A and 2B illustrate an example of a perspective view of a wearable device, according to an embodiment.

According to an embodiment, a wearable device 200 may have a form of glasses wearable on a user's body part (e.g., head). The wearable device 200 of FIGS. 2A to 2B may be an example of the electronic device 101 of FIG. 1. The wearable device 200 may include a head-mounted display (HMD). For example, a housing of the wearable device 200 may include a flexible material having a form that is in close contact with a portion of the user's head (e.g., a portion of a face covering both eyes), such as rubber and/or silicone. For example, the housing of the wearable device 200 may include one or more straps able to be twined around the user's head and/or one or more temples attachable to ear of the head.

Referring to FIG. 2A, according to an embodiment, the wearable device 200 may include at least one display 250 and a frame 295 supporting the at least one display 250.

According to an embodiment, the wearable device 200 may be wearable on a portion of the user's body. The wearable device 200 may provide augmented reality (AR), virtual reality (VR), or mixed reality (MR) combining the augmented reality and the virtual reality to a user wearing the wearable device 200. For example, the wearable device 200 may display a virtual reality image provided from at least one optical device 282 and 284 in FIG. 2B on at least one display 250, in response to a user's preset gesture obtained through a motion recognition camera 260-2 and 260-3 of FIG. 2B.

According to an embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the user's left and right eyes, respectively.

Referring to FIG. 2B, the at least one display 250 may provide visual information transmitted from external light to a user and other visual information distinguished from the above visual information, through a lens included in at least one display 250. The lens may be formed based on at least one of a fresnel lens, a pancake lens, or a multi-channel lens. For example, the at least one display 250 may include a first surface 231 and a second surface 232 opposite to the first surface 231. A display area may be formed on the second surface 232 of at least one display 250. When the user wears the wearable device 200, ambient light may be transmitted to the user by being incident on the first surface 231 and being penetrated through the second surface 232. For another example, the at least one display 250 may display an augmented reality image in which a virtual reality image provided by the at least one optical device 282 and 284 is combined with a reality screen transmitted through external light, on a display area formed on the second surface 232.

According to an embodiment, the at least one display 250 may include at least one waveguide 233 and 234 that transmits light transmitted from the at least one optical device 282 and 284 by diffracting to the user. The at least one waveguide 233 and 234 may be formed based on at least one of glass, plastic, or polymer. A nano pattern may be formed on at least a portion of the outside or inside of the at least one waveguide 233 and 234. The nano pattern may be formed based on a grating structure having a polygonal or curved shape. Light incident to an end of the at least one waveguide 233 and 234 may be propagated to another end of the at least one waveguide 233 and 234 by the nano pattern. The at least one waveguide 233 and 234 may include at least one of at least one diffraction element (e.g., a diffractive optical element (DOE), a holographic optical element (HOE)), and a reflection element (e.g., a reflection mirror). For example, the at least one waveguide 233 and 234 may be disposed in the wearable device 200 to guide a screen displayed by the at least one display 250 to the user's eyes. For example, the screen may be transmitted to the user's eyes through total internal reflection (TIR) generated in the at least one waveguide 233 and 234.

The wearable device 200 may analyze an object included in a real image collected through a photographing camera 260-4, combine with a virtual object corresponding to an object that become a subject of augmented reality provision among the analyzed object, and display on the at least one display 250. The virtual object may include at least one of text and images for various information associated with the object included in the real image. The wearable device 200 may analyze the object based on a multi-camera, such as a stereo camera. For the object analysis, the wearable device 200 may execute spatial recognition (e.g., simultaneous localization and mapping (SLAM) using the multi-camera and/or time-of-flight (ToF). The user wearing the wearable device 200 may watch an image displayed on the at least one display 250.

According to an embodiment, a frame 295 may be configured with a physical structure in which the wearable device 200 may be worn on the user's body. According to an embodiment, the frame 295 may be configured so that when the user wears the wearable device 200, the first display 250-1 and the second display 250-2 may be positioned corresponding to the user's left and right eyes. The frame 295 may support the at least one display 250. For example, the frame 295 may support the first display 250-1 and the second display 250-2 to be positioned at positions corresponding to the user's left and right eyes.

Referring to FIG. 2A, according to an embodiment, the frame 295 may include an area 220 at least partially in contact with the portion of the user's body in case that the user wears the wearable device 200. For example, the area 220 of the frame 295 in contact with the portion of the user's body may include an area in contact with a portion of the user's nose, a portion of the user's ear, and a portion of the side of the user's face that the wearable device 200 contacts. According to an embodiment, the frame 295 may include a nose pad 210 that is contacted on the portion of the user's body. When the wearable device 200 is worn by the user, the nose pad 210 may be contacted on the portion of the user's nose. The frame 295 may include a first temple 204 and a second temple 205 that is contacted on another portion of the user's body that is distinct from the portion of the user's body.

For example, the frame 295 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of the edge of the first rim 201 from one end of the bridge 203, a second pad 212 disposed along a portion of the edge of the second rim 202 from the other end of the bridge 203, the first temple 204 extending from the first rim 201 and fixed to a portion of the wearer's ear, and the second temple 205 extending from the second rim 202 and fixed to a portion of the ear opposite to the ear. The first pad 211 and the second pad 212 may be in contact with the portion of the user's nose, and the first temple 204 and the second temple 205 may be in contact with a portion of the user's face and the portion of the user's ear. The temples 204 and 205 may be rotatably connected to the rim through hinge units 206 and 207 of FIG. 2B. The first temple 204 may be rotatably connected with respect to the first rim 201 through the first hinge unit 206 disposed between the first rim 201 and the first temple 204. The second temple 205 may be rotatably connected with respect to the second rim 202 through the second hinge unit 207 disposed between the second rim 202 and the second temple 205. According to an embodiment, the wearable device 200 may identify an external object (e.g., a user's fingertip) touching the frame 295 and/or a gesture performed by the external object by using a touch sensor, a grip sensor, and/or a proximity sensor formed on at least a portion of the surface of the frame 295.

According to an embodiment, the wearable device 200 may include hardware (e.g., hardware to be described later based on a block diagram of FIG. 4) that performs various functions. For example, the hardware may include a battery module 270, an antenna module 275, the at least one optical device 282 and 284, speakers (e.g., speakers 255-1 and 255-2), a microphone (e.g., microphones 265-1, 265-2, and 265-3), a light emitting module (not illustrated), and/or a printed circuit board (PCB) 290 (e.g., printed circuit board). Various hardware may be disposed in the frame 295.

According to an embodiment, the microphone (e.g., the microphones 265-1, 265-2, and 265-3) of the wearable device 200 may obtain a sound signal, by being disposed on at least a portion of the frame 295. The first microphone 265-1 disposed on the bridge 203, the second microphone 265-2 disposed on the second rim 202, and the third microphone 265-3 disposed on the first rim 201 are illustrated in FIG. 2B, but the number and disposition of the microphone 265 are not limited to an embodiment of FIG. 2B. In case that the number of the microphone 265 included in the wearable device 200 is two or more, the wearable device 200 may identify the direction of the sound signal by using a plurality of microphones disposed on different portions of the frame 295.

According to an embodiment, the at least one optical device 282 and 284 may project a virtual object on the at least one display 250 in order to provide various image information to the user. For example, the at least one optical device 282 and 284 may be a projector. The at least one optical device 282 and 284 may be disposed adjacent to the at least one display 250 or may be included in the at least one display 250 as a portion of the at least one display 250. According to an embodiment, the wearable device 200 may include a first optical device 282 corresponding to the first display 250-1, and a second optical device 284 corresponding to the second display 250-2. For example, the at least one optical device 282 and 284 may include the first optical device 282 disposed at a periphery of the first display 250-1 and the second optical device 284 disposed at a periphery of the second display 250-2. The first optical device 282 may transmit light to the first waveguide 233 disposed on the first display 250-1, and the second optical device 284 may transmit light to the second waveguide 234 disposed on the second display 250-2.

In an embodiment, a camera 260 may include the photographing camera 260-4, an eye tracking camera (ET CAM) 260-1, and/or the motion recognition camera 260-2 and camera 260-3. The photographing camera 260-4, the eye tracking camera 260-1, and the motion recognition camera 260-2 and camera 260-2 may be disposed at different positions on the frame 295 and may perform different functions. The eye tracking camera 260-1 may output data indicating a position of eye or the gaze of the user wearing the wearable device 200. For example, the wearable device 200 may detect the gaze from an image including the user's pupil obtained through the eye tracking camera 260-1. The wearable device 200 may identify an object (e.g., a real object, and/or a virtual object) focused by the user, by using the user's gaze obtained through the eye tracking camera 260-1. The wearable device 200 identifying the focused object may execute a function (e.g., gaze interaction) for interaction between the user and the focused object. The wearable device 200 may represent a portion corresponding to eye of an avatar indicating the user in the virtual space, by using the user's gaze obtained through the eye tracking camera 260-1. The wearable device 200 may render an image (or a screen) displayed on the at least one display 250, based on the position of the user's eye. For example, visual quality of a first area related to the gaze within the image and visual quality (e.g., resolution, brightness, saturation, grayscale, and PPI) of a second area distinguished from the first area may be different. The wearable device 200 may obtain an image having the visual quality of the first area matching the user's gaze and the visual quality of the second area by using foveated rendering. For example, when the wearable device 200 supports an iris recognition function, user authentication may be performed based on iris information obtained using the eye tracking camera 260-1. An example in which the eye tracking camera 260-1 is disposed toward the user's right eye is illustrated in FIG. 2B, but the embodiment is not limited thereto, and the eye tracking camera 260-1 may be disposed alone toward the user's left eye or may be disposed toward two eyes.

In an embodiment, the photographing camera 260-4 may photograph a real image or background to be matched with a virtual image in order to implement the augmented reality or mixed reality content. The photographing camera 260-4 may be used to obtain an image having a high resolution based on a high resolution (HR) or a photo video (PV). The photographing camera 260-4 may photograph an image of a specific object existing at a position viewed by the user and may provide the image to the at least one display 250. The at least one display 250 may display one image in which a virtual image provided through the at least one optical device 282 and 284 is overlapped with information on the real image or background including an image of the specific object obtained by using the photographing camera. The wearable device 200 may compensate for depth information (e.g., a distance between the wearable device 200 and an external object obtained through a depth sensor), by using an image obtained through the photographing camera 260-4. The wearable device 200 may perform object recognition through an image obtained using the photographing camera 260-4. The wearable device 200 may perform a function (e.g., auto focus) of focusing an object (or subject) within an image and/or an optical image stabilization (OIS) function (e.g., an anti-shaking function) by using the photographing camera 260-4. While displaying a screen representing a virtual space on the at least one display 250, the wearable device 200 may perform a pass through function for displaying an image obtained through the photographing camera 260-4 overlapping at least a portion of the screen. In an embodiment, the photographing camera may be disposed on the bridge 203 disposed between the first rim 201 and the second rim 202.

The eye tracking camera 260-1 may implement a more realistic augmented reality by matching the user's gaze with the visual information provided on the at least one display 250, by tracking the gaze of the user wearing the wearable device 200. For example, when the user looks at the front, the wearable device 200 may naturally display environment information associated with the user's front on the at least one display 250 at a position where the user is positioned. The eye tracking camera 260-1 may be configured to capture an image of the user's pupil in order to determine the user's gaze. For example, the eye tracking camera 260-1 may receive gaze detection light reflected from the user's pupil and may track the user's gaze based on the position and movement of the received gaze detection light. In an embodiment, the eye tracking camera 260-1 may be disposed at a position corresponding to the user's left and right eyes. For example, the eye tracking camera 260-1 may be disposed in the first rim 201 and/or the second rim 202 to face the direction in which the user wearing the wearable device 200 is positioned.

The motion recognition camera 260-2 and camera 260-3 may provide a specific event to the screen provided on the at least one display 250 by recognizing the movement of the whole or portion of the user's body, such as the user's torso, hand, or face. The motion recognition camera 260-2 and camera 260-3 may obtain a signal corresponding to the gesture by recognizing the user's gesture, and may provide a display corresponding to the signal to the at least one display 250. The processor may identify a signal corresponding to the operation and may perform a preset function based on the identification. The motion recognition camera 260-2 and 260-3 may be used to perform simultaneous localization and mapping (SLAM) for 6 degrees of freedom pose (6 dof pose) and/or a spatial recognition function using a depth map. The processor may perform a gesture recognition function and/or an object tracking function, by using the motion recognition cameras 260-2 and 260-3. In an embodiment, the motion recognition camera 260-2 and camera 260-3 may be disposed on the first rim 201 and/or the second rim 202.

The camera 260 included in the wearable device 200 is not limited to the above-described eye tracking camera 260-1 and the motion recognition camera 260-2 and 260-3. For example, the wearable device 200 may identify an external object included in the FoV by using a camera disposed toward the user's FoV. That the wearable device 200 identifies the external object may be performed based on a sensor for identifying a distance between the wearable device 200 and the external object, such as a depth sensor and/or a time of flight (ToF) sensor. The camera 260 disposed toward the FoV may support an autofocus function and/or an optical image stabilization (OIS) function. For example, in order to obtain an image including a face of the user wearing the wearable device 200, the wearable device 200 may include the camera 260 (e.g., a face tracking (FT) camera) disposed toward the face.

Although not illustrated, the wearable device 200 according to an embodiment may further include a light source (e.g., LED) that emits light toward a subject (e.g., user's eyes, face, and/or an external object in the FoV) photographed by using the camera 260. The light source may include an LED having an infrared wavelength. The light source may be disposed on at least one of the frame 295, and the hinge units 206 and 207.

According to an embodiment, the battery module 270 may supply power to electronic components of the wearable device 200. In an embodiment, the battery module 270 may be disposed in the first temple 204 and/or the second temple 205. For example, the battery module 270 may be a plurality of battery modules 270. The plurality of battery modules 270, respectively, may be disposed on each of the first temple 204 and the second temple 205. In an embodiment, the battery module 270 may be disposed at an end of the first temple 204 and/or the second temple 205.

The antenna module 275 may transmit the signal or power to the outside of the wearable device 200 or may receive the signal or power from the outside. In an embodiment, the antenna module 275 may be disposed in the first temple 204 and/or the second temple 205. For example, the antenna module 275 may be disposed close to one surface of the first temple 204 and/or the second temple 205.

A speaker 255 may output a sound signal to the outside of the wearable device 200. A sound output module may be referred to as a speaker. In an embodiment, the speaker 255 may be disposed in the first temple 204 and/or the second temple 205 in order to be disposed adjacent to the ear of the user wearing the wearable device 200. For example, the speaker 255 may include a second speaker 255-2 disposed adjacent to the user's left ear by being disposed in the first temple 204, and a first speaker 255-1 disposed adjacent to the user's right ear by being disposed in the second temple 205.

The light emitting module (not illustrated) may include at least one light emitting element. The light emitting module may emit light of a color corresponding to a specific state or may emit light through an operation corresponding to the specific state in order to visually provide information on a specific state of the wearable device 200 to the user. For example, when the wearable device 200 requires charging, it may emit red light at a constant cycle. In an embodiment, the light emitting module may be disposed on the first rim 201 and/or the second rim 202.

Referring to FIG. 2B, according to an embodiment, the wearable device 200 may include the printed circuit board (PCB) 290. The PCB 290 may be included in at least one of the first temple 204 or the second temple 205. The PCB 290 may include an interposer disposed between at least two sub PCBs. On the PCB 290, one or more hardware (e.g., hardware illustrated by different blocks of FIG. 4) included in the wearable device 200 may be disposed. The wearable device 200 may include a flexible PCB (FPCB) for interconnecting the hardware.

According to an embodiment, the wearable device 200 may include at least one of a gyro sensor, a gravity sensor, and/or an acceleration sensor for detecting the posture of the wearable device 200 and/or the posture of a body part (e.g., a head) of the user wearing the wearable device 200. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 200 may identify the user's motion and/or gesture performed to execute or stop a specific function of the wearable device 200 based on the IMU.

Figure 3A:
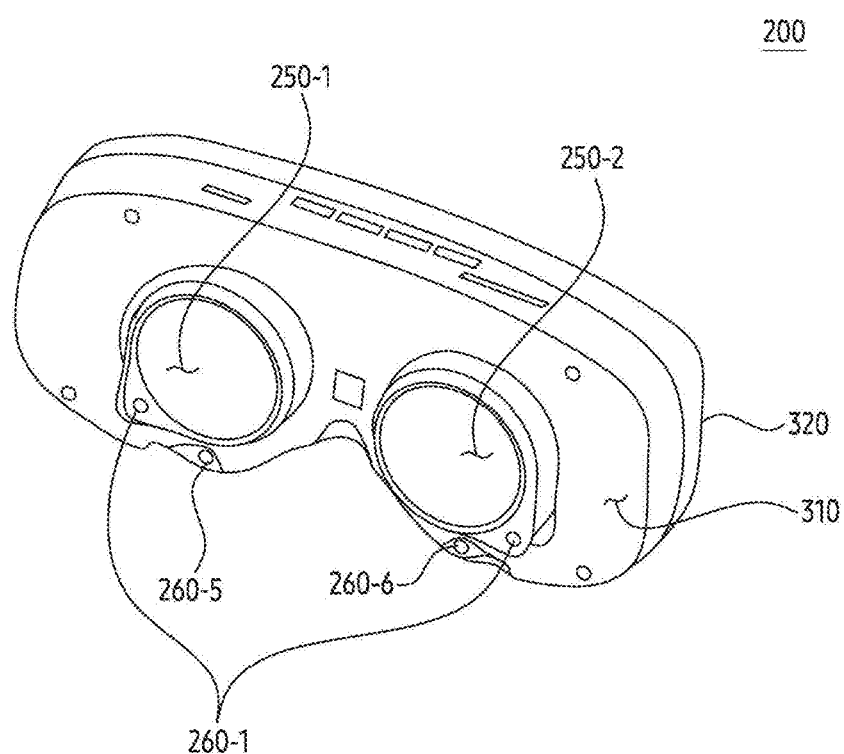
FIGS. 3A and 3B illustrate an example of the exterior of a wearable device, according to an embodiment.
Figure 3B:
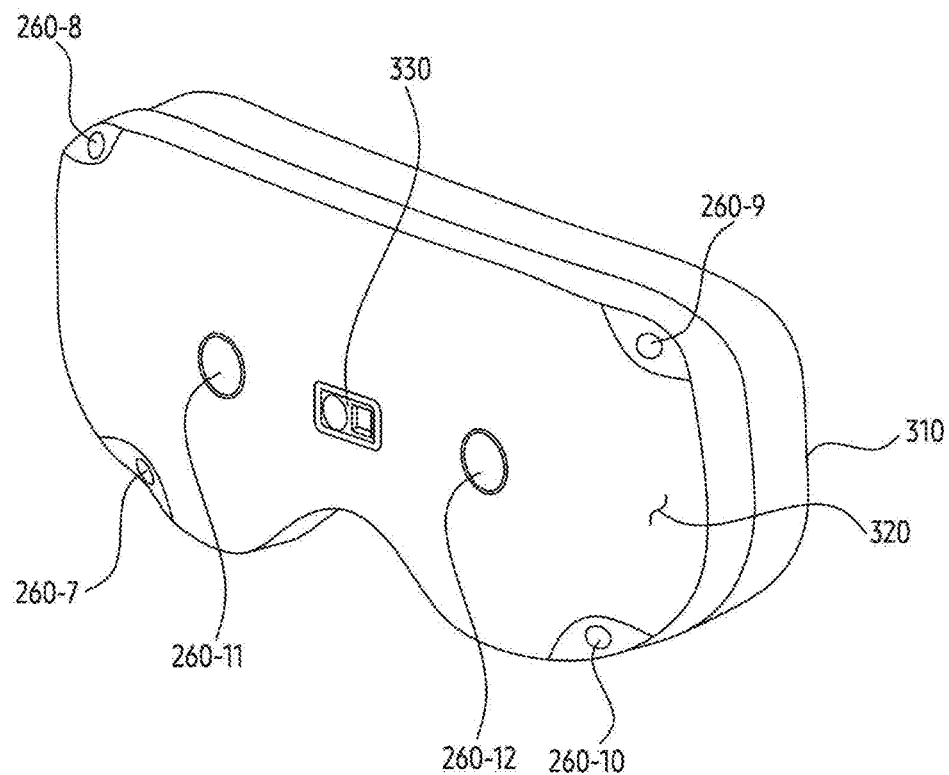

FIGS. 3A and 3B illustrate an example of the exterior of a wearable device, according to an embodiment. A wearable device 200 of FIGS. 3A and 3B may be an example of the electronic device 101 of FIG. 1 and the wearable device 200 of FIGS. 2A and 2B. According to an embodiment, an example of the exterior of a first surface 310 of a housing of the wearable device 200 may be illustrated in FIG. 3A, and an example of the exterior of a second surface 320 opposite to the first surface 310 may be illustrated in FIG. 3B.

Referring to FIG. 3A, according to an embodiment, the first surface 310 of the wearable device 200 may have an attachable shape on the user's body part (e.g., the user's face). Although not illustrated, the wearable device 200 may further include a strap for being fixed on the user's body part, and/or one or more temples (e.g., the first temple 204 and/or the second temple 205 of FIGS. 2A to 2B). A first display 250-1 for outputting an image to the left eye among the user's two eyes and a second display 250-2 for outputting an image to the right eye among the user's two eyes may be disposed on the first surface 310. The wearable device 200 may further include rubber or silicon packing for preventing interference by light (e.g., ambient light) formed on the first surface 310 and different from the light emitted from the first display 250-1 and the second display 250-2.

According to an embodiment, the wearable device 200 may include cameras 260-1 for photographing and/or tracking two eyes of the user adjacent to each of the first display 250-1 and the second display 250-2. The cameras 260-1 may be referred to as the gaze tracking camera 260-1 of FIG. 2B. According to an embodiment, the wearable device 200 may include cameras 260-5 and 260-6 for photographing and/or recognizing the user's face. The cameras 260-5 and 260-6 may be referred to as an FT camera. The wearable device 200 may control an avatar representing a user in a virtual space, based on a motion of the user's face identified using the cameras 260-5 and 260-6. For example, the wearable device 200 may change a texture and/or a shape of a portion (e.g., a portion of an avatar representing a human face) of the avatar, by using information obtained by the cameras 260-5 and 260-6 (e.g., the FT camera) and representing the facial expression of the user wearing the wearable device 200.

Referring to FIG. 3B, a camera (e.g., cameras 260-7, 260-8, 260-9, 260-10, 260-11, and 260-12), and/or a sensor (e.g., the depth sensor 330) for obtaining information associated with the external environment of the wearable device 200 may be disposed on the second surface 320 opposite to the first surface 310 of FIG. 3A. For example, the cameras 260-7, 260-8, 260-9, and 260-10 may be disposed on the second surface 320 in order to recognize an external object. The cameras 260-7, 260-8, 260-9, and 260-10 may refer to the motion recognition cameras 260-2 and 260-3 of FIG. 2B.

For example, by using cameras 260-11 and 260-12, the wearable device 200 may obtain an image and/or video to be transmitted to each of the user's two eyes. The camera 260-11 may be disposed on the second surface 320 of the wearable device 200 to obtain an image to be displayed through the second display 250-2 corresponding to the right eye among the two eyes. The camera 260-12 may be disposed on the second surface 320 of the wearable device 200 to obtain an image to be displayed through the first display 250-1 corresponding to the left eye among the two eyes. The cameras 260-11 and 260-12 may refer to the photographing camera 260-4 of FIG. 2B.

According to an embodiment, the wearable device 200 may include the depth sensor 330 disposed on the second surface 320 in order to identify a distance between the wearable device 200 and the external object. By using the depth sensor 330, the wearable device 200 may obtain spatial information (e.g., a depth map) about at least a portion of the FoV of the user wearing the wearable device 200. Although not illustrated, a microphone for obtaining sound outputted from the external object may be disposed on the second surface 320 of the wearable device 200. The number of microphones may be one or more according to embodiments.

Figure 4:
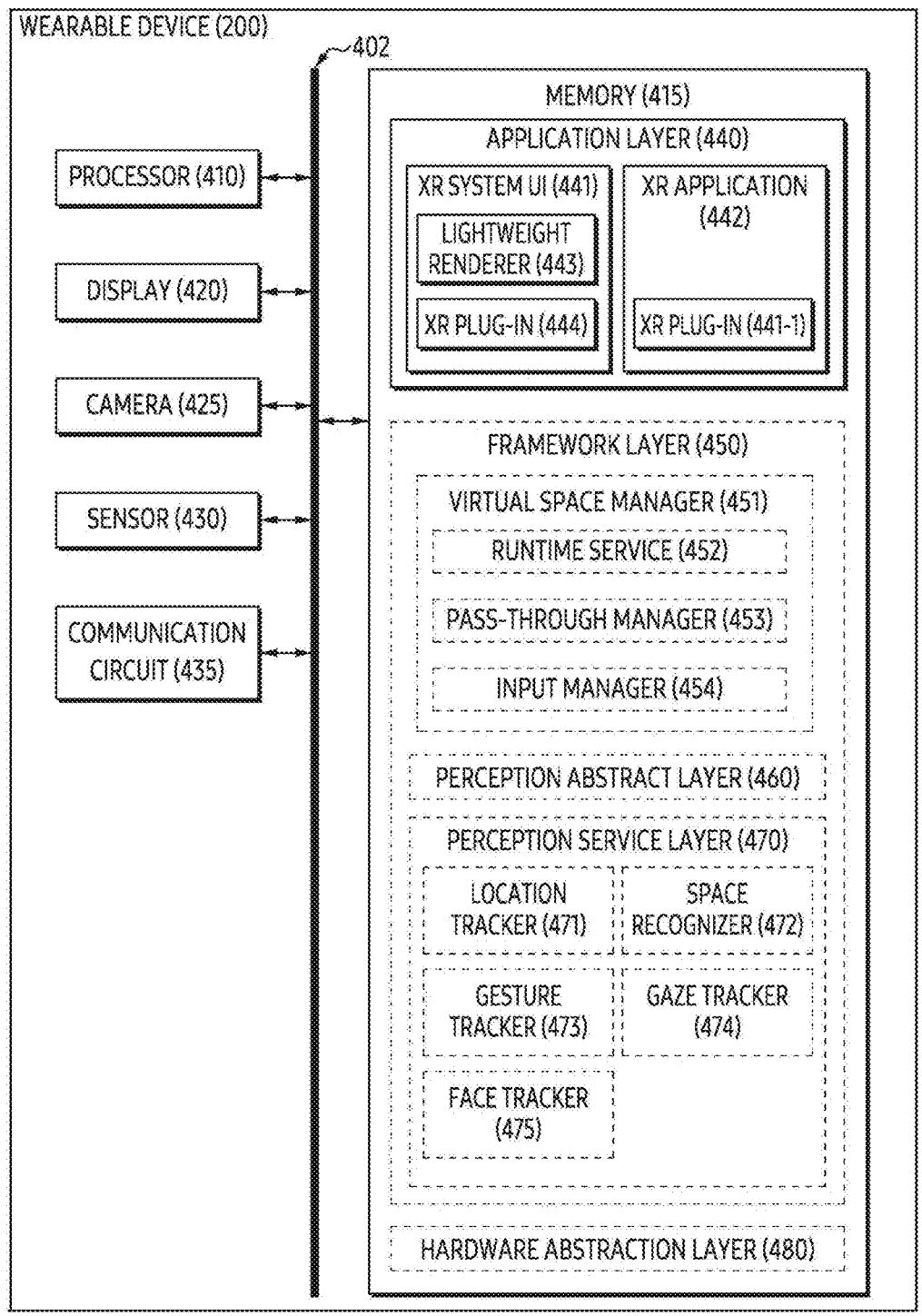
FIG. 4 illustrates an example of a block diagram of a wearable device, according to an embodiment.

FIG. 4 illustrates an example of a block diagram of a wearable device, according to an embodiment. Referring to FIG. 4, a wearable device 200 according to an embodiment may include at least one of a processor 410, a memory 415, a display 420, a camera 425, a sensor 430, and a communication circuit 435. The processor 410, the memory 415, the display 420, the camera 425, the sensor 430, and the communication circuit 435 may be electronically and/or operably coupled with each other by an electronical component such as a communication bus 402. The type and/or number of hardware component included in the wearable device 200 is not limited to those illustrated in FIG. 4. For example, the wearable device 200 may include only a portion of the hardware component illustrated in FIG. 4. Elements (e.g., layers and/or modules) in the memory described later may be a logically divided state. However, it is not limited thereto.

According to an embodiment, the processor 410 of the wearable device 200 may include a hardware component for processing data based on one or more instructions. For example, a hardware component for processing data may include an arithmetic and logic unit (ALU), a field programmable gate array (FPGA), and/or a central processing unit (CPU). The number of processors 410 may be one or more. For example, the processor 410 may have a structure of a multi-core processor such as a dual core, a quad core, or a hexa core.

According to an embodiment, the memory 415 of the wearable device 200 may include a hardware component for storing data and/or instructions inputted and/or outputted to the processor 410. For example, the memory 415 may include a volatile memory such as random-access memory (RAM) and/or a non-volatile memory such as read-only memory (ROM). For example, the volatile memory may include at least one of a dynamic RAM (DRAM), a static RAM (SRAM), a Cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, a compact disk, and an embedded multi-media card (eMMC).

In an embodiment, the display 420 of the wearable device 200 may output visualized information to the user of the wearable device 200. For example, the display 420 may output the visualized information to the user by being controlled by the processor 410 including a circuit such as a graphic processing unit (GPU). The display 420 may include a flat panel display (FPD) and/or electronic paper. The FPD may include a liquid crystal display (LCD), a plasma display panel (PDP), and/or one or more light emitting diode (LED). The LED may include an organic LED (OLED).

In an embodiment, the camera 425 of the wearable device 200 may include one or more optical sensors (e.g., a charged coupled device (CCD) sensor and a complementary metal oxide semiconductor (CMOS) sensor) that generate an electrical signal representing the color and/or brightness of light. A plurality of optical sensors included in the camera 425 may be disposed in the form of a 2-dimensional array. The camera 425 may substantially simultaneously obtain electrical signals of each of a plurality of optical sensors to generate 2D frame data corresponding to light reaching the optical sensors of a 2D grid. For example, photograph data captured using the camera 425 may mean a 2D frame data obtained from the camera 425. For example, video data captured using the camera 425 may mean a sequence of a plurality of 2D frame data obtained from the camera 425 according to a frame rate. The camera 425 may further include a flash-light, disposed toward a direction in which the camera 425 receives light, for outputting light in the direction.

According to an embodiment, the wearable device 200 may include a plurality of cameras disposed toward different directions as an example of the camera 425. The camera 425 may include one or more of the cameras 260 as previously described. Among the plurality of cameras, a first camera may be referred to as a motion recognition camera (e.g., the motion recognition cameras 260-2 and 260-3 of FIG. 2B), and a second camera may be referred to as a gaze tracking camera (e.g., the eye tracking camera 260-1 of FIG. 2B). The wearable device 200 may identify a location, a shape, and/or a gesture of a hand by using an image obtained using the first camera. The wearable device 200 may identify a direction of a gaze of a user wearing the wearable device 200, by using an image obtained using the second camera. For example, a direction in which the first camera faces and a direction in which the second camera faces may be opposite.

According to an embodiment, the sensor 430 of the wearable device 200 may generate electronic information processable by the processor 410 and/or the memory 415 of the wearable device 200 from non-electronic information related to the wearable device 200. The information may be referred to as sensor data. The sensor 430 may include a global positioning system (GPS) sensor for detecting a geographic location of the wearable device 200, an image sensor, an illuminance sensor, and/or a time-of-flight (ToF) sensor, and an inertial measurement unit (IMU) for detecting physical motion of the wearable device 200.

In an embodiment, the communication circuit 435 of the wearable device 200 may include a hardware component for supporting transmission and/or reception of an electrical signal between the wearable device 200 and an external electronic device. For example, the communication circuit 435 may include at least one of a MODEM, an antenna, and an optic/electronic (O/E) converter. The communication circuit 435 may support the transmission and/or reception of the electrical signal, based on various types of protocols such as Ethernet, local area network (LAN), wide area network (WAN), wireless fidelity (Wi-Fi), Bluetooth, Bluetooth low energy (BLE), ZigBee, long term evolution (LTE), 5G new radio (NR), and/or 6G.

According to an embodiment, in the memory 415 of the wearable device 200, one or more instructions (or commands) indicating a calculation and/or an operation to be performed on data by the processor 410 of the wearable device 200 may be stored. A set of one or more instructions may be referred to as firmware, operating system, process, routine, sub-routine, and/or application. For example, the wearable device 200 and/or the processor 410 may perform at least one of operations according to an embodiment described later when a set of instructions distributed in the form of operating system, firmware, driver, and/or application is executed. Hereinafter, the application being installed in the wearable device 200 may mean that one or more instructions provided in the form of an application are stored in the memory 415, and the one or more applications are stored in an executable format (e.g., a file having an extension designated by the operating system of the wearable device 200) by the processor 410. As an example, the application may include a program and/or a library related to a service provided to a user.

Referring to FIG. 4, programs installed in the wearable device 200 may be classified into one of different layers including an application layer 440, a framework layer 450, and/or a hardware abstraction layer (HAL) 480 based on a target. For example, programs (e.g., module or driver) designed to targeting hardware (e.g., the display 420, the camera 425, and/or the sensor 430) of the wearable device 200 may be classified in the hardware abstraction layer 480. In terms of including one or more programs for providing an extended reality (XR) service, the framework layer 450 may be referred to as an XR framework layer. For example, FIG. 4 illustrates layers divided in the memory 415, but the layers may be logically divided. However, it is not limited thereto. According to an embodiment, the layers may be stored in a designated area in the memory 415.

For example, programs (e.g., a location tracker 471, a space recognizer 472 (also referred to as spatial recognizer 472), a gesture tracker 473, and/or a gaze tracker 474, a face tracker 475) designed to target at least one of the hardware abstraction layer 480 and/or the application layer 440 may be classified in the framework layer 450. The programs classified into the framework layer 450 may provide an application programming interface (API) executable based on another program.

For example, a program designed to target a user controlling the wearable device 200 may be classified in the application layer 440. As an example of programs classified as the application layer 440, an extended reality (XR) system user interface (UI) and/or an XR application 442 are illustrated, but the embodiment is not limited thereto. For example, the programs (e.g., software application) classified as the application layer 440 may cause execution of a function supported by the programs classified as the framework layer 450, by calling an application programming interface (API).

For example, the wearable device 200 may display one or more visual objects on the display 420 for performing interaction with a user to use a virtual space, based on execution of an XR system UI 441. The visual object may refer to an object deployable in a screen for information transmission and/or interaction, such as text, image, icon, video, button, check box, radio button, text box, slider, and/or table. The visual object may be referred to as a visual guide, a virtual object, a visual element, a UI element view object, and/or a view element. The wearable device 200 may provide a user with a service capable of controlling functions available in a virtual space, based on the execution of the XR system UI 441.

Referring to FIG. 4, a lightweight renderer 443 and/or an XR plug-in 444 are illustrated to be included in the XR system UI 441, but are not limited thereto. For example, the XR system UI 441 may cause execution of a function supported by the lightweight renderer 443 and/or the XR plug-in 444.

For example, based on the execution of the lightweight renderer 443, the wearable device 200 may obtain a resource (e.g., API, system process, and/or library) used to define, create, and/or execute a rendering pipeline allowed partial changes. In terms of defining the rendering pipeline allowed partial changes, the lightweight renderer 443 may be referred to as a lightweight render pipeline. The lightweight renderer 443 may include a renderer (e.g., a prebuilt renderer) built prior to execution of a software application. For example, based on the execution of the XR plug-in 444, the wearable device 200 may obtain a resource (e.g., API, system process, and/or library) used to define, create, and/or execute the entire rendering pipeline. In terms of defining (or setting) the entire rendering pipeline, the XR plug-in 444 may be referred to as an open XR native client.

For example, the wearable device 200 may display a screen representing at least a portion of a virtual space on the display 420, based on the execution of the XR application 442. An XR plug-in 444-1 included in the XR application 442 may be referred to the XR plug-in 444 of the XR system UI 441. Among the descriptions of the XR plug-in 444-1, descriptions overlapping those of the XR plug-in 444 may be omitted. The wearable device 200 may cause the execution of a virtual space manager 451, based on the execution of the XR application 442.

According to an embodiment, the wearable device 200 may provide a virtual space service based on the execution of the virtual space manager 451. For example, the virtual space manager 451 may include a platform (e.g., Android platform) for supporting the virtual space service. Based on the execution of the virtual space manager 451, the wearable device 200 may display a posture of a virtual object representing a posture of a user rendered by using data obtained through the sensor 430 on the display. The virtual space manager 451 may be referred to as a composition presentation manager (CPM).

For example, the virtual space manager 451 may include a runtime service 452. For example, the runtime service 452 may be referred to as an OpenXR runtime module. Based on the execution of the runtime service 452, the wearable device 200 may be used to provide at least one of a user's pose prediction function, a frame timing function, and/or a space input function through the wearable device 200. As an example, the wearable device 200 may be used to perform rendering for the virtual space service to a user, based on the execution of the runtime service 452. For example, an application (e.g., unity or OpenXR native application) may be implemented based on the execution of the runtime service 452.

For example, the virtual space manager 451 may include a pass-through manager 453. While displaying a screen representing a virtual space on the display 420, the wearable device 200 may display another screen representing a real space obtained through the camera 425 by overlapping at least a portion of the screen, based on the execution of the pass-through manager 453.

For example, the virtual space manager 451 may include an input manager 454. Based on the execution of the input manager 454, the wearable device 200 may identify data (e.g., sensor data) obtained by executing one or more programs included in a perception service layer 470. The wearable device 200 may initiate execution of at least one of functions of the wearable device 200 by using the obtained data.

For example, a perception abstract layer 460 may be used for data exchange between the virtual space manager 451 and the perception service layer 470. In terms of being used for data exchange between the virtual space manager 451 and the perception service layer 470, the perception abstract layer 460 may be referred to as an interface. As an example, the perception abstract layer 460 may be referred to as an OpenPX. The perception abstract layer 460 may be used for a perception client and a perception service.

According to an embodiment, the perception service layer 470 may include one or more programs for processing data obtained from the sensor 430 (or the camera 425). The one or more programs may include at least one of a location tracker 471, a spatial recognizer 472, a gesture tracker 473, a gaze tracker 474, and/or a face tracker 475. The type and/or number of one or more programs included in the perception service layer 470 is not limited to those illustrated in FIG. 4.

For example, the wearable device 200 may identify a posture of the wearable device 200 by using the sensor 430, based on the execution of the location tracker 471. Based on the execution of the location tracker 471, the wearable device 200 may identify a 6 degrees of freedom pose (6 dof pose) of the wearable device 200, by using data obtained using the camera 425 and the IMU. The location tracker 471 may be referred to as a head tracking (HeT) module.

For example, the wearable device 200 may be used to configure a surrounding environment of the wearable device 200 (or the user of the wearable device 200) as a 3D virtual space, based on the execution of the spatial recognizer 472. Based on the execution of the spatial recognizer 472, the wearable device 200 may reconstruct the surrounding environment of the wearable device 200 in 3D, by using data obtained using the camera 425. The wearable device 200 may identify at least one of a plane, an inclination, and a step, based on the surrounding environment of the wearable device 200 reconstructed in 3D based on the execution of the spatial recognizer 472. The spatial recognizer 472 may be referred to as a scene understanding (SU) module.

For example, the wearable device 200 may be used to identify (or recognize) a pose and/or gesture of the user's hand of the wearable device 200, based on the execution of the gesture tracker 473. As an example, the wearable device 200 may identify the pose and/or gesture of the user's hand by using data obtained from the sensor 430, based on the execution of the gesture tracker 473. As an example, the wearable device 200 may identify the pose and/or gesture of the user's hand based on data (or image) obtained using a camera, based on the execution of the gesture tracker 473. The gesture tracker 473 may be referred to as a hand tracking (HaT) module and/or a gesture tracking module.

For example, the wearable device 200 may identify (or track) movement of the user's eye of the wearable device 200, based on the execution of the gaze tracker 474. As an example, the wearable device 200 may identify the movement of the user's eyes, by using data obtained from at least one sensor, based on the execution of the gaze tracker 474. As an example, the wearable device 200 may identify the movement of the user's eyes, based on data obtained using a camera (e.g., the eye tracking camera 260-1 of FIGS. 2A and 2B) and/or an infrared light emitting diode (IR LED), based on the execution of the gaze tracker 474. The gaze tracker 474 may be referred to as an eye tracking (ET) module and/or a gaze tracking module.

For example, the perception service layer 470 of the wearable device 200 may further include the face tracker 475 for tracking the user's face. For example, the wearable device 200 may identify (or track) movement of the user's face and/or the user's facial expression, based on the execution of the face tracker 475. Based on the execution of the face tracker 475, the wearable device 200 may estimate the user's facial expression based on the movement of the user's face. As an example, based on the execution of the face tracker 475, the wearable device 200 may identify the movement of the user's face and/or the user's facial expression based on data (e.g., image) obtained using the camera.

For embodiments described later, the wearable device 200 of FIG. 4 may be referred. For example, embodiments described later may be performed by the processor 410 of the wearable device 200 of FIG. 4.

Figure 5:
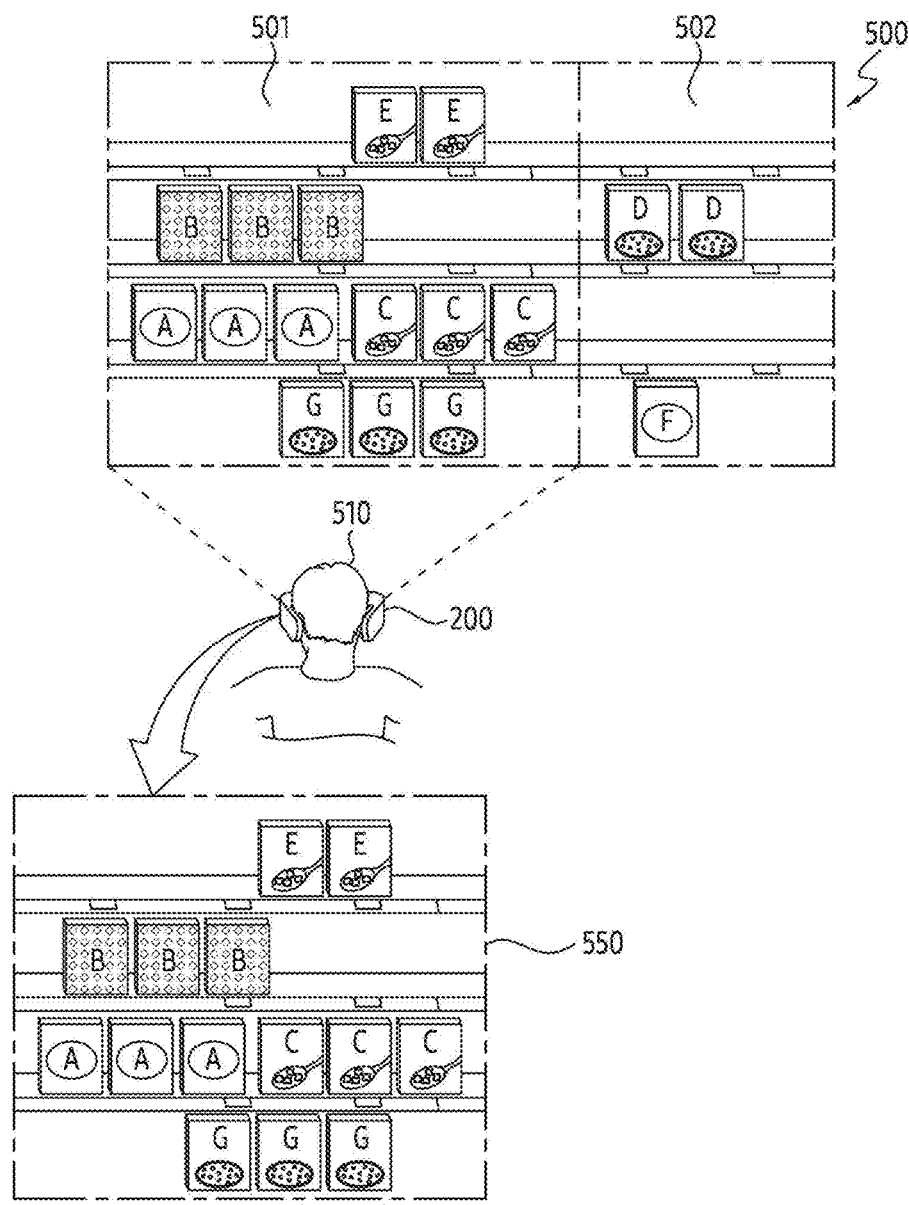
FIG. 5 illustrates an example of a screen displayed through a display of a wearable device, according to an embodiment.

FIG. 5 illustrates an example of a screen displayed through a display of a wearable device, according to an embodiment.

Referring to FIG. 5, a wearable device 200 may correspond to the wearable device 200 illustrated in FIG. 4. For example, the wearable device 200 may include a camera 425 disposed toward the front of a user 510 in a state worn by the user 510. The front of the user 510 may correspond to a direction in which a head of the user 510 and/or a gaze of the user 510 face. The wearable device 200 according to an embodiment may include a sensor 430 for identifying the head of the user 510 and/or motion of the wearable device 200, in a state worn by the user 510.

A processor 410 of the wearable device 200 may identify an angle of the wearable device 200, based on data obtained through the sensor 430. In order to provide a user interface (UI) based on a virtual reality (VR), an augmented reality (AR), and/or a mixed reality (MR) to the user 510 wearing the wearable device 200, the processor 410 may control the camera 425 and/or the sensor 430. The UI may be related to a metaverse service and/or a notification service provided by the wearable device 200 and/or a server connected to the wearable device 200.

According to an embodiment, the processor 410 may provide a screen (or virtual space) related to an augmented reality (AR) and/or a mixed reality (MR).

For example, the wearable device 200 may operate based on an optical see through (OST). For example, the processor 410 may display a screen (e.g., a screen 550) (or an image) including an image in which a real object and a virtual object are mixed through the display 420. For example, in a state in which the user 510 wears the wearable device 200, the processor 410 may identify ambient light passing through at least one lens disposed adjacent to eye of the user 510. The ambient light passing through the lens may be combined (or mixed) with light emitted from the display 420 of the wearable device 200. A display area of the display 420 may be formed within a lens through which the ambient light passes. Since the processor 410 combines the ambient light and the light emitted from the display 420, the user 510 may see an image in which a real object recognized by the ambient light and a virtual object formed by the light emitted from the display 420 are mixed.

For example, the wearable device 200 may operate based on a video see through (VST). For example, the processor 410 may display a screen provided to the user 510, based on a video (or a rendered image). For example, the processor 410 may obtain an image of an external environment (e.g., an external environment 501) by using the camera 425. The processor 410 may display a screen including an image of an external environment and a visual object overlapping the image through the display 420.

As an example, an external environment 500 may include an external environment 501 and an external environment 502. The wearable device 200 may be located toward the external environment 501. The processor 410 may display a screen 550 corresponding to the external environment 501. When the wearable device 200 operates based on the OST, the screen 550 may be configured to include a real object and a virtual object. When the wearable device 200 operates based on the VST, the screen 550 may be configured to include an image obtained through the camera 425 and a visual object overlapping the image.

According to an embodiment, the processor 410 may recognize a space (e.g., a real space) where the user 510 (or the wearable device 200) is located, to create a virtual space mapped to the space. Spatial recognition performed by the processor 410 may include simultaneous localization and mapping (SLAM) and/or spatial mapping (e.g., scene understanding).

According to an embodiment, the processor 410 may receive a request for identification of an external object corresponding to a target object from the user 510. The processor 410 may identify the external object corresponding to the target object in the external environment 500. For example, the processor 410 may identify a visual object related to the external object corresponding to the target object in at least one image obtained during a designated time interval. The processor 410 may emphasize and display the visual object related to the external object. Therefore, the processor 410 may provide information on a location of the external object corresponding to the target object to the user, by identifying the external object corresponding to the target object in the external environment and emphasizing and displaying the visual object related to the external object. An operation of the wearable device 200 (or the processor 410) according to the above-described embodiment will be described below.

Figure 6:
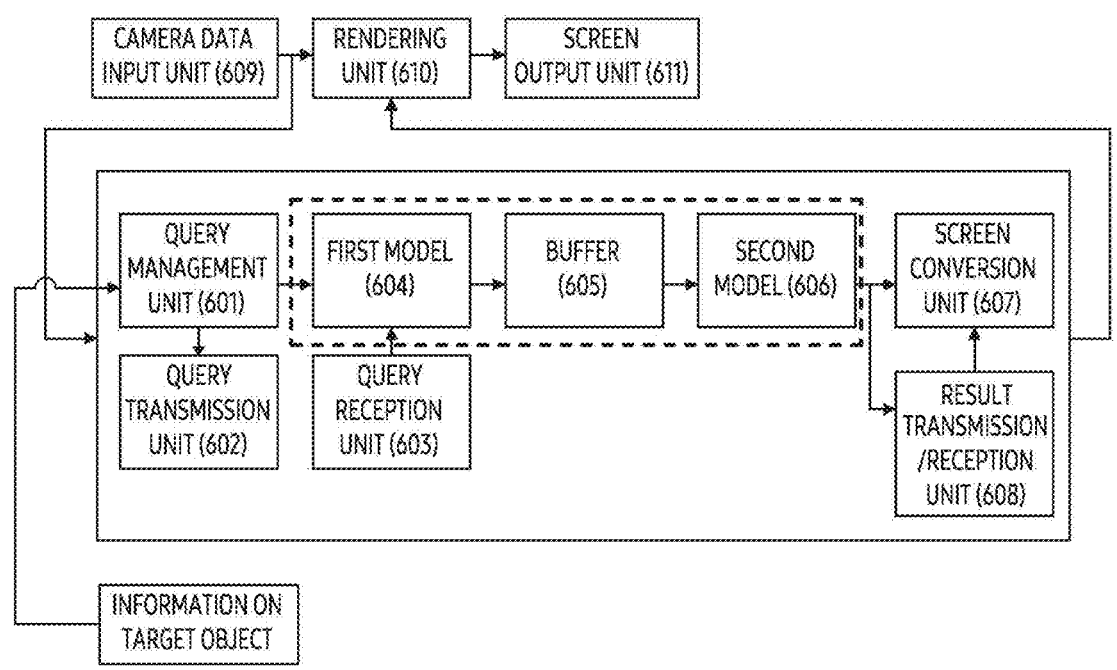
FIG. 6 illustrates components of a wearable device for identifying an external object corresponding to a target object, according to an embodiment.

FIG. 6 illustrates components of a wearable device for identifying an external object corresponding to a target object, according to an embodiment.

Referring to FIG. 6, components illustrated in FIG. 6 refer to units that process at least one function or operation, which may be implemented by hardware or software, or a combination thereof. According to an embodiment, at least a part of components illustrated in FIG. 6 may be omitted. According to an embodiment, at least a part of the components illustrated in FIG. 6 may be included in an external electronic device (e.g., an electronic device for controlling a server or a wearable device 200) and operated.

The processor 410 may identify time information rendered in real time. The processor 410 may identify (or configure, obtain) a spatial map configured within a designated time interval (or time-window). Based on visual information or a spatial map rendered in real time, a plurality of external objects in an external environment may be identified. The processor 410 may identify an external object corresponding to a target object among the plurality of external objects.

For example, the processor 410 may operate in a mode for identifying the external object corresponding to the target object among a plurality of objects in the external environment. The mode may be referred to as a visual search mode. The processor 410 may identify (or obtain) information on the target object within the mode. The processor 410 may identify the external object corresponding to the target object among the plurality of objects in the external environment, by using components illustrated in FIG. 6.

The processor 410 may provide an image obtained through the camera 425 to another component, by using a camera data input unit 609. The image may be related to the external environment. The image may include a plurality of visual objects corresponding to the plurality of objects in the external environment.

The processor 410 may manage information on the target object by using a query management unit 601. For example, the processor 410 may identify information on the target object, based on a user input. The information on the target object may include information on a shape and/or a visual pattern of the target object and information on a size of the target object. For example, the information on the shape and/or the visual pattern of the target object may include an image including the target object. The visual pattern may refer to a visual design, which may include labels, logos, text, images, and other such features other than shape. According to an embodiment, the information on the target object may further include depth information of the target object (or a visual object corresponding to the target object). An example in which the depth information of the target object (or a visual object corresponding to the target object) is utilized will be described later in reference to FIG. 8B. For example, the processor 410 may identify information on a depth of the target object by using a ToF sensor. For example, the processor 410 may identify information on the depth of the target object, based on images obtained based on a distance between two or more cameras spaced apart from each other. The processor 410 may identify the information on the size of the target object, based on the information on the depth of the target object.

The processor 410 may receive information on the target object from the user, in order to search an external object corresponding to the target object in an external environment. In terms of being used to search for the target object from the user, the information on the target object may be referred to as a query. For example, the information on the shape and/or visual pattern of the target object may be referred to as a main query. The information on the size of the target object may be referred to as an additional query. According to an embodiment, information for identifying an external object corresponding to the target object other than information on the shape and/or visual pattern of the target object may be referred to as the additional query. For example, information on a designated time interval for identifying the external object corresponding to the target object may be referred to as the additional query.

According to an embodiment, the processor 410 may identify the external object corresponding to the target object, by using an external wearable device. The processor 410 may transmit the information (or query) on the target object to the external wearable device, by using a query transmission unit 602. According to an embodiment, the processor 410 may receive the information (or query) on the target object from the external wearable device, by using a query reception unit 603. A specific example in which the processor 410 identifies an external object corresponding to a target object by using an external wearable device will be described in detail with reference to FIGS. 10 to 11B.

The processor 410 may identify candidate visual objects corresponding to the target object by using a first model 604, spatial information (e.g., spatial map) constructed based on information related to information on a frame being rendered in real time within a designated time interval or information on simultaneous localization and mapping (SLAM). For example, the processor 410 may identify at least one feature point of the target object, based on the main query (or information on the shape and/or visual pattern of the target object). The processor 410 may set the at least one feature point and the spatial information of the target object as an input value of the first model 604. The processor 410 may identify candidate visual objects, based on an output value of the first model 604. The processor 410 may identify a visual object related to the external object corresponding to the target object, based on the output value of the first model 604.

The processor 410 may store the candidate visual objects using a buffer 605. The processor 410 may store the candidate visual objects in order to identify the visual object related to the external object corresponding to the target object, among the candidate visual objects by using a second model 606.

The processor 410 may identify the visual object related to the external object corresponding to the target object, among the candidate visual objects by using the second model 606. The processor 410 may identify the visual object related to the external object corresponding to the target object among the candidate visual objects, based on an additional query (e.g., the information on the size of the target object). For example, the processor 410 may set the candidate visual objects and the additional query (e.g., the information on the size of the target object) as an input value of the second model 606. The processor 410 may identify the visual object related to the external object corresponding to the target object, based on an output value of the second model 606.

For example, each of the first model 604 and the second model 606 may be indicated by a plurality of parameters.

Each of the first model 604 and the second model 606 may be configured based on an artificial intelligence model. For example, the artificial intelligence model may correspond to the artificial intelligence model described in FIG. 1.

According to an embodiment, the processor 410 may transmit information on the visual object related to the external object corresponding to the target object to the external wearable device, by using a result transmission/reception unit 608. The information on the visual object may include at least one of information on a location of the external object or information on a time at which the visual object was identified. The processor 410 may receive the information on the visual object from the external wearable device, by using the result transmission/reception unit 608. For example, the information on the visual object may include information on a center point related to the visual object, information on a bounding box related to the visual object, or information on segmentation of pixel level.

When an image including the visual object is displayed, the processor 410 may change the image including the visual object to emphasize the visual object related to the external object corresponding to the target object, by using a screen conversion unit 607. When the image including the visual object is not displayed through the display 420, the processor 410 may display an affordance for changing the user's gaze to display the image including the visual object, by using the screen conversion unit 607.

The processor 410 may configure a screen to be displayed through the display 420, by using a rendering unit 610. Based on the image (or affordance) obtained through the screen conversion unit 607 and the data on the external environment obtained through the camera data input unit 609, the processor 410 may configure a screen to be displayed through the display 420 by using the rendering unit 610. The processor 410 may display a screen configured using a screen output unit 611 through the display 420.

Figure 7:
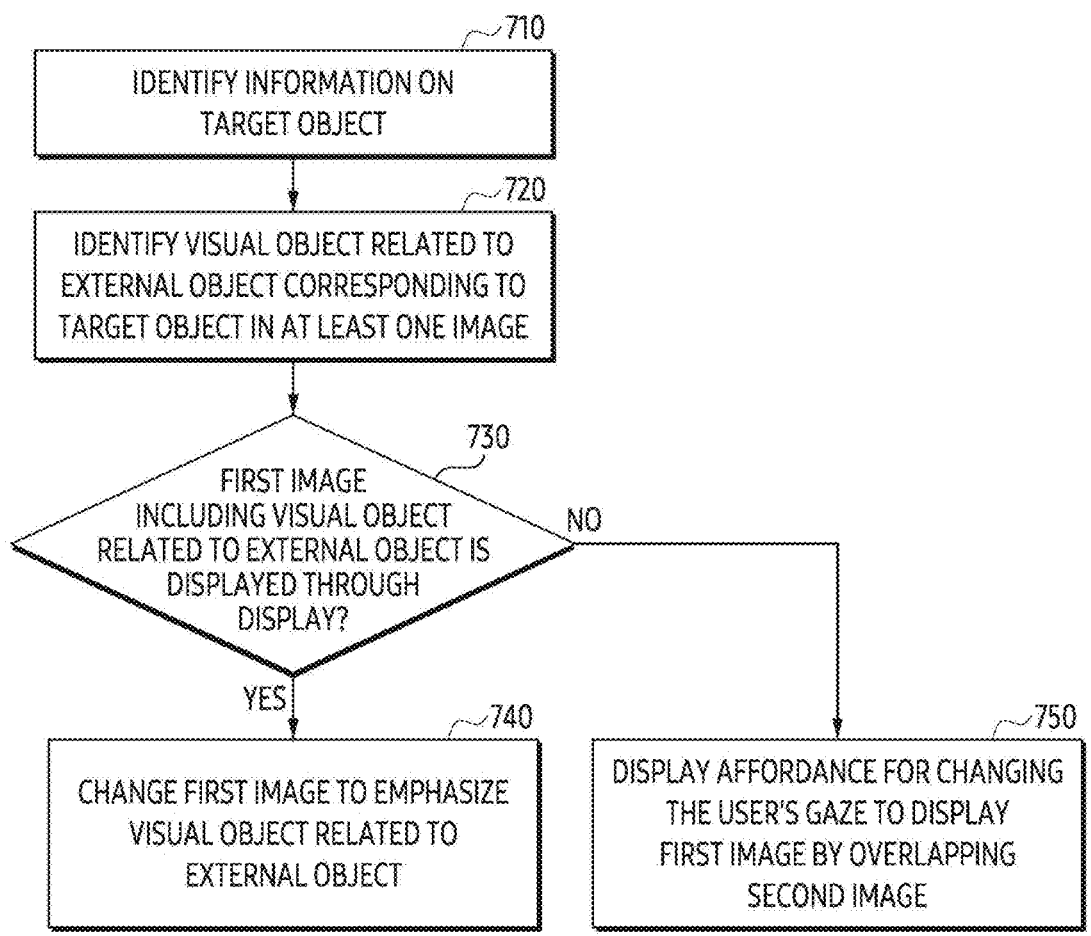
FIG. 7 is a flowchart illustrating an operation of a wearable device, according to an embodiment.

FIG. 7 is a flowchart illustrating an operation of a wearable device, according to an embodiment. In the following embodiment, each operation may be performed sequentially, but is not necessarily performed sequentially. For example, a sequence of each operation may be changed, and at least two operations may be performed in parallel.

Referring to FIG. 7, in operation 710, a processor 410 may identify information on a target object. For example, the processor 410 may set a mode of a wearable device 200 to a mode for identifying an external object corresponding to the target object. As an example, the processor 410 may set the mode of the wearable device 200 to a mode for identifying an external object corresponding to the target object based on a user input. The user input may include an input of a designated motion (e.g., a movement of eye, a movement of hand, a movement of a controller connected to the wearable device 200) input, and a designated voice input.

According to an embodiment, the processor 410 may identify information on the target object within the mode for identifying an external object corresponding to the target object. For example, the processor 410 may identify information on the target object, based on a result searched through a network. The processor 410 may search for the target object based on a user input. The processor 410 may identify information (e.g., information on a shape and/or a visual pattern of the target object) on the target object, based on identifying at least one target image for the target object. For example, the processor 410 may identify information on the target object, based on information stored in a memory 415. For example, the processor 410 may identify information on the target object, based on an image on the target object identified through a gallery application. For example, the processor 410 may identify information on the target object, based on identifying a file (e.g., text, image, video) about the target object identified through the file search application.

For example, the processor 410 may identify additional information on the target object. The processor 410 may identify information on a size (e.g., 10 cm height) of the target object, based on a user input. The processor 410 may identify information on a designated time interval (e.g., last 30 seconds) for identifying the target object based on a user input.

According to an embodiment, the information on the target object may be used to find an external object corresponding to the target object. The information on the target object may be referred to as a query.

In operation 720, the processor 410 may identify a visual object related to an external object corresponding to the target object in at least one image. For example, the processor 410 may identify a visual object related to the external object corresponding to the target object in at least one image obtained based on a gaze of a user 510 of the wearable device 200 during a designated time interval.

According to an embodiment, the processor 410 may identify (or obtain) at least one image, based on the gaze of the user 510 of the wearable device 200 during the designated time interval. For example, as the user's gaze is changed, an image obtained through a camera 425 may be changed. The processor 410 may identify at least one image obtained as the user's gaze is changed during the designated time interval.

For example, the processor 410 may identify at least one image obtained before a designated time interval from a time at which the information on the target object was identified. The processor 410 may identify a visual object related to the external object corresponding to the target object in the at least one image.

For example, the at least one image may include images obtained based on a designated time interval during a designated time interval. For example, the at least one image may include images (e.g., frames) continuously obtained during a designated time interval. For example, the at least one image may be related to an external environment. Each of the at least one image may represent portion of the external environments.

According to an embodiment, the processor 410 may identify candidate visual objects corresponding to the target object, based on information on a shape and/or a visual pattern of the target object included in the information on the target object. The candidate visual objects may be configured based on the shape and/or visual pattern of the target object in the at least one image. The processor 410 may identify a visual object related to an external object corresponding to the target object among the candidate visual objects, based on the information on a size of the target object included in the information on the target object. For example, each of the candidate visual objects may be a visual object cropped from the at least one image.

According to an embodiment, the processor 410 may obtain information on a plurality of visual objects included the in at least one image. The processor 410 may store the information on the plurality of visual objects in the memory 415. The processor 410 may set the information on the plurality of visual objects and the information on the target object as an input value of a designated model (e.g., a first model 604 or a second model 606 of FIG. 6) indicated by a plurality of parameters. The processor 410 may identify a visual object related to the external object corresponding to the target object in the at least one image, based on an output value of the designated model.

According to an embodiment, the processor 410 may identify spatial information on the external object, based on the at least one image. For example, the processor 410 may identify a spatial map based on the at least one image. The processor 410 may identify a visual object related to the external object corresponding to the target object, based on the identified spatial map. The processor 410 may identify a location of the visual object related to the external object corresponding to the target object, based on the identified spatial map.

According to an embodiment, the processor 410 may identify a plurality of external objects of various classes (or undefined classes) on the spatial map, based on at least one image identified during the designated time interval. The processor 410 may identify candidate visual objects corresponding to the target object by using a designated model (e.g., the first model 604 of FIG. 6). The processor 410 may identify external objects corresponding to the candidate visual object in the spatial map. For example, the processor 410 may identify the candidate visual objects (or visual objects related to external objects) within the at least one image, based on image feature similarity.

As an example, the processor 410 may identify feature points of each of a plurality of external objects (or a plurality of visual objects related to a plurality of external objects). The processor 410 may identify feature points of the target object (or an image related to the target object). The processor 410 may identify the candidate visual objects, based on identifying similarity between the feature points of each of the plurality of external objects and the feature points of the target object.

As described above, the processor 410 may identify candidate visual objects based on identifying similarity between two or more multi-dimensional vectors (e.g., feature points of each of the plurality of external objects and feature points of the target object).

According to an embodiment, the processor 410 may identify images of the target object viewed from various directions, based on the image of the target object. The processor 410 may identify a visual object similar to one of the images of the target object viewed from various directions as one of the candidate visual objects.

The processor 410 may store each of the candidate visual objects in the memory 415 (e.g., the buffer 605 of FIG. 6), in the form of coordinates within the corresponding image (or spatial map). The processor 410 may identify the visual object related to the external object corresponding to the target object among the candidate visual objects, by using a designated model (e.g., the second model 606 of FIG. 6).

In operation 730, the processor 410 may identify whether a first image including a visual object related to an external object is displayed through the display 420. For example, the processor 410 may identify whether a first image including a visual object is displayed through the display 420, based on a gaze of the user 510.

The processor 410 may identify a visual object related to an external object corresponding to the target object in at least one image obtained during the designated time interval. Since the at least one image was identified in the past, the visual object may not be included in an image currently displayed through the display 420. Accordingly, the processor 410 may identify whether the first image including the visual object is displayed through the display 420 based on the gaze of the user 510.

For example, the first image may refer to an image including the visual object. The first image being displayed through the display 420 may mean that an external object corresponding to the target object exists in a field of view (FoV) of the camera 425 of the wearable device 200.

In operation 740, when the first image including the visual object related to the external object corresponding to the target object is displayed through the display 420, the processor 410 may change the first image to emphasize the visual object related to the external object. For example, the processor 410 may change the first image to emphasize the visual object related to the external object, based on identifying that the first image including the visual object is displayed through the display 420.

For example, the processor 410 may change a display of a remaining area in the first image except for an area corresponding to the visual object, based on identifying that the first image including the visual object related to the external object is displayed through the display 420. As an example, the processor 410 may maintain a color of the area corresponding to the visual object in the first image, and set a color of the remaining area to black-and-white or grayscale. As an example, the processor 410 may omit the remaining area except for the area corresponding to the visual object in the first image. As an example, the processor 410 may identify data on the area corresponding to the visual object in the first image, and display only the visual object based on the identified data. For example, the processor 410 may emphasize and display borders of the visual object in the first image.

For example, the processor 410 may display an element for emphasizing the visual object related to the external object in the first image. As an example, the processor 410 may display a bounding box related to the visual object related to the external object in the first image. As an example, the processor 410 may display an element (e.g., arrow, circle, polygon, exclamation mark) indicating the visual object related to the external object.

According to an embodiment, the processor 410 may identify a distance between the external object and the wearable device 200. The processor 410 may display information on the distance between the external object and the wearable device 200 in association with the visual object related to the external object. For example, the processor 410 may display text indicating the distance between the external object and the wearable device 200 together with the visual object related to the external object.

In operation 750, when the first image including the visual object related to the external object corresponding to the target object is not displayed through the display 420, the processor 410 may display an affordance for changing the user's gaze to display the first image including the visual object related to the external object by overlapping a second image. For example, based on identifying that the second image distinct from the first image including the visual object related to the external object is displayed through the display 420, the processor 410 may display an affordance for changing the gaze of the user 510 to display the first image, by overlapping the second image. For example, the second image may be referred to as an image that does not include the visual object related to the external object. For example, the affordance for changing the gaze of the user 510 may include arrow, mini-map, or pop-up window.

According to an embodiment, the processor 410 may display the first image including the visual object related to the external object through the display 420, based on that the gaze of the user 510 is changed to face the external object corresponding to the target object. The processor 410 may perform operation 740, based on the second image being changed to the first image.

Figure 8A:
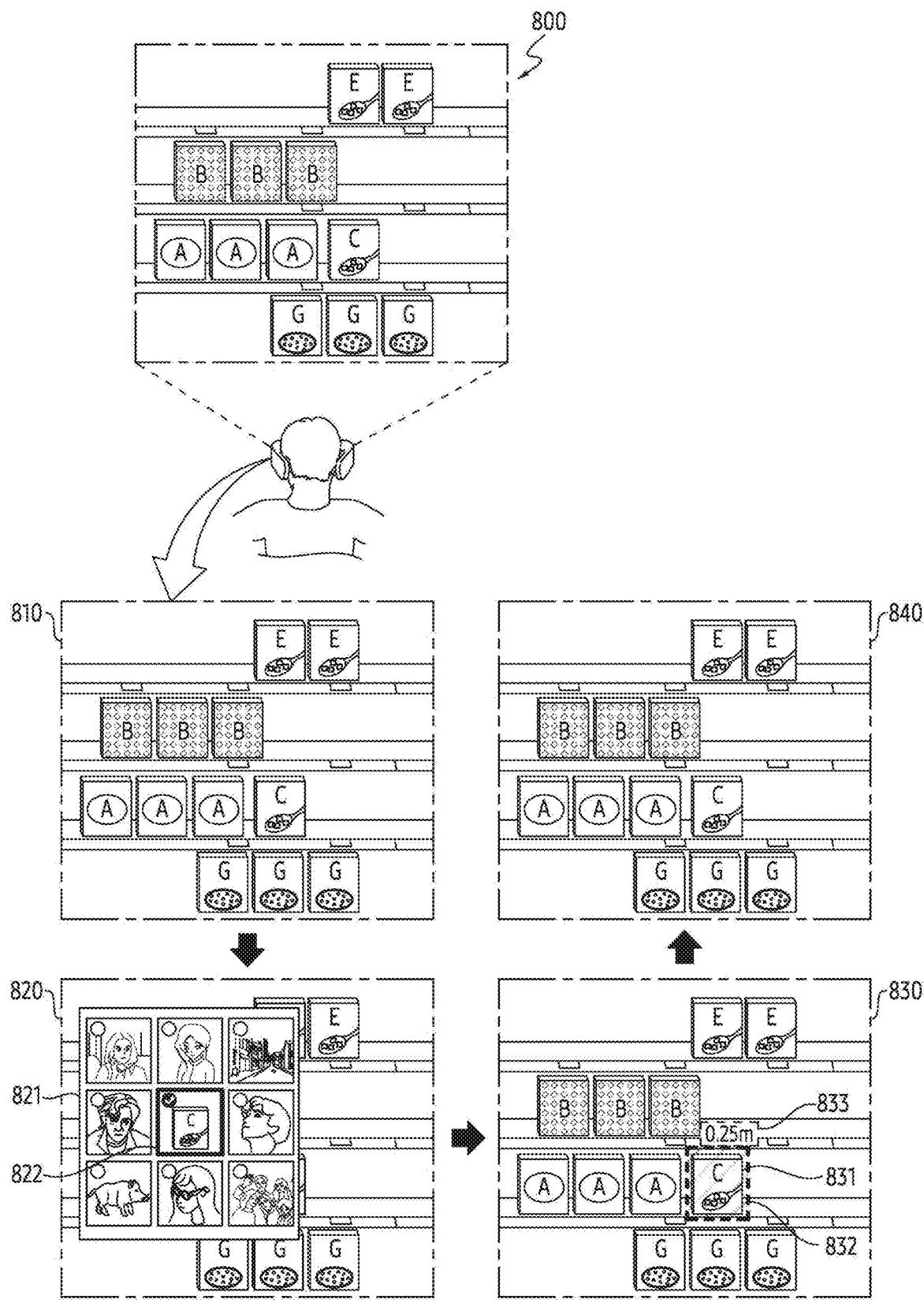
FIG. 8A illustrates an example of an operation of a wearable device, according to an embodiment.

FIG. 8A illustrates an example of an operation of a wearable device, according to an embodiment.

Referring to FIG. 8A, a wearable device 200 may be disposed to face an external environment 800. A user 510 of the wearable device 200 may be in a state of looking at the external environment 800. A processor 410 may obtain data on the external environment 800 by using a camera 425. The processor 410 may obtain an image 810 of the external environment 800, based on the data on the external environment 800. The processor 410 may display the image 810 through a display 420.

For example, the external environment 800 may include a plurality of external objects. For example, the external environment 800 may be a market including a plurality of products. The image 810 may include a plurality of visual objects corresponding to the plurality of products. The user 510 may set a mode of the wearable device 200 to a mode for identifying an external object corresponding to a target object.

According to an embodiment, the processor 410 may set a mode of the wearable device 200 to the mode for identifying the external object corresponding to the target object (e.g., a target product). In the mode for identifying the external object (e.g., an actual product) corresponding to the target object, the processor 410 may identify information on the target object. For example, the processor 410 may identify information on the target object based on a user input.

For example, the processor 410 may identify a user input for executing a gallery application. The processor 410 may display an image 820 in which a user interface 821 related to the gallery application is displayed by overlapping the image 810. The processor 410 may identify an input selecting an image 822 related to the target object (e.g., C cereal) in the user interface 821 related to the gallery application. The processor 410 may identify information on the target object based on the identified input. The processor 410 may identify information on a shape and/or a visual pattern of the target object, based on the image 822 related to the target object. Further, the processor 410 may perform visual pattern matching that adjusts for variations in orientation, lighting, and scale to identify a most likely match.

The processor 410 may identify feature points of the image 822 related to the target object. The processor 410 may identify feature points of each of a plurality of visual objects included in the image 810. The processor 410 may set the feature points of each of the plurality of visual objects and the feature points of the image 822 as an input value of a designated model (e.g., the first model 604 or the second model 606 of FIG. 6). Based on an output value of the designated model, the processor 410 may identify a visual object 831 related to the external object corresponding to the target object.

The processor 410 may display an image 830 through the display 420 based on identifying the visual object 831. The processor 410 may display the image 830 in which the visual object 831 is emphasized.

For example, the processor 410 may remove a color of a remaining area except for an area corresponding to the visual object 831. The processor 410 may maintain a color of the area corresponding to the visual object 831, and display the color of the remaining area based on the gray scale.

For example, the processor 410 may display a bounding box 832 in the area corresponding to the visual object 831. The processor 410 may display the bounding box 832 by overlapping the visual object 831. Positioning of the bounding box 832 can be adjusted as the user 510 moves relative to the visual object 831.

For example, the processor 410 may change the color of the visual object 831 (or an area corresponding to the visual object 831). The processor 410 may identify the reliability of the output value of the designated model. The processor 410 may change the color of the visual object 831 based on reliability. As an example, as the reliability is lower, the processor 410 may change the color of the visual object 831 to a color similar to surrounding color(s) of the visual object 831. As the reliability is higher, the processor 410 may change the color of the visual object 831 to a color distinguished from the surrounding color(s) of the visual object 831.

According to an embodiment, the processor 410 may identify a distance between an external object and the wearable device 200. The processor 410 may display information on the distance between the external object and the wearable device 200 on the display 420 together with the visual object 831. The image 830 may include text 833 indicating the distance between the external object and the wearable device 200. The text 833 may be displayed in association with the visual object 831.

According to an embodiment, the user 510 may identify the visual object 831 related to the external object corresponding to the target object. The processor 410 may identify a user input for terminating the mode for identifying the external object corresponding to the target object while the image 830 is displayed through the display 420. Based on the user input, the processor 410 may change the image displayed through the display 420 from the image 830 to an image 840. The image 840 may correspond to the image 810.

Figure 8B:
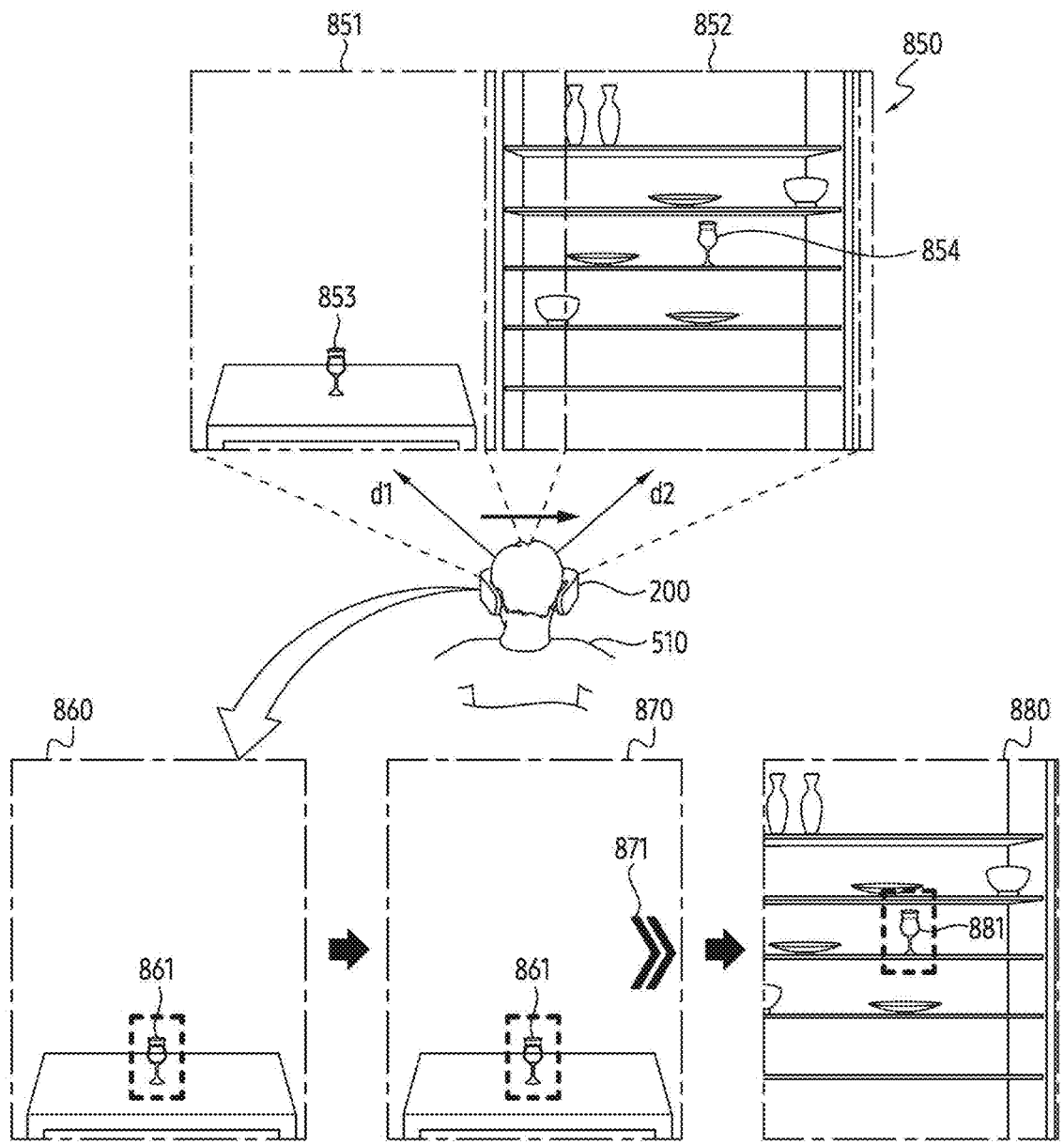
FIG. 8B illustrates an example of an operation of a wearable device, according to an embodiment.

FIG. 8B illustrates an example of an operation of a wearable device, according to an embodiment.

Referring to FIG. 8B, the wearable device 200 may be disposed to face a first portion 851 of the external environment 850 based on a direction d1. The user 510 of the wearable device 200 may be in a state of looking at the first portion 851 of the external environment 850. The processor 410 may obtain data on the first portion 851 of the external environment 850 by using the camera 425. The processor 410 may obtain an image 860 related to the first portion 851 of the external environment 850, based on data on the first portion 851 of the external environment 850. The processor 410 may display the image 860 through the display 420.

For example, the processor 410 may be in a state in which an image related to a second portion 852 of the external environment 850 is obtained. The processor 410 may store information on a plurality of external objects included in the second portion 852 of the external environment 850 in the memory 415. For example, the processor 410 may store information on the external object 854 in the memory 415.

According to an embodiment, the user 510 may set a mode of the wearable device 200 to a mode for identifying an external object corresponding to a target object. For example, the processor 410 may set an external object 853 as a target object while the image 860 is displayed through the display 420. The processor 410 may set the external object 853 as the target object, based on an input with respect to a visual object 861 corresponding to the external object 853.

In the mode for identifying the external object corresponding to the target object, the processor 410 may identify information on the target object. For example, the processor 410 may identify information on the target object, based on the visual object 861. The processor 410 may identify information on a shape and/or a visual pattern of the target object based on the visual object 861.

For example, the processor 410 may identify information on a depth of the visual object 861. The processor 410 may identify information on a size of the external object 854 (or the target object), based on the information on the depth of the visual object 861. As an example, the processor 410 may identify the information on the depth of the visual object 861 using a ToF sensor. As an example, the processor 410 may identify the information on the depth of the visual object 861, based on images obtained based on a distance between two or more cameras spaced apart from each other. The processor 410 may identify the information on the size of the external object 854 (or the target object), based on the information on the depth of the visual object 861.

For example, the processor 410 may identify images of the target object viewed from various directions, based on the visual object 861. The processor 410 may identify the external object 854 based on the images of the target object viewed from various directions.

For example, the processor 410 may identify the external object 854 corresponding to the external object 853 which is a target object in the external environment 850. The external object 854 may be included in the second portion 852 of the external environment 850. The processor 410 may display an image 870 including an affordance 871 (e.g., a suggestion or prompt in a graphical and/or text form) for changing a direction of a gaze of the user 510 to face a direction d2 through the display 420. In the image 870, the affordance 871 is configured with arrow, but it is exemplary and is not limited thereto. Although not illustrated, the affordance 871 may be configured with mini map, exclamation point, and color.

After the image 870 including the affordance 871 is displayed through the display 420, the processor 410 may identify that a direction in which the wearable device 200 (or the gaze of the user 510) faces is changed from the direction d1 to the direction d2.

The processor 410 may display an image 880 related to the second portion 852 of the external environment 850, based on the direction d2 in which the wearable device 200 faces. The processor 410 may display the image 880 including a visual object 881 related to the external object 854 corresponding to a target object (i.e., the external object 853) on the display 420. For example, the processor 410 may change the image 880 to emphasize the visual object 881. The processor 410 may change the image 880 based on maintaining a color of an area corresponding to the visual object 881 in the image 880 and removing a color of a remaining area.

Figure 9:
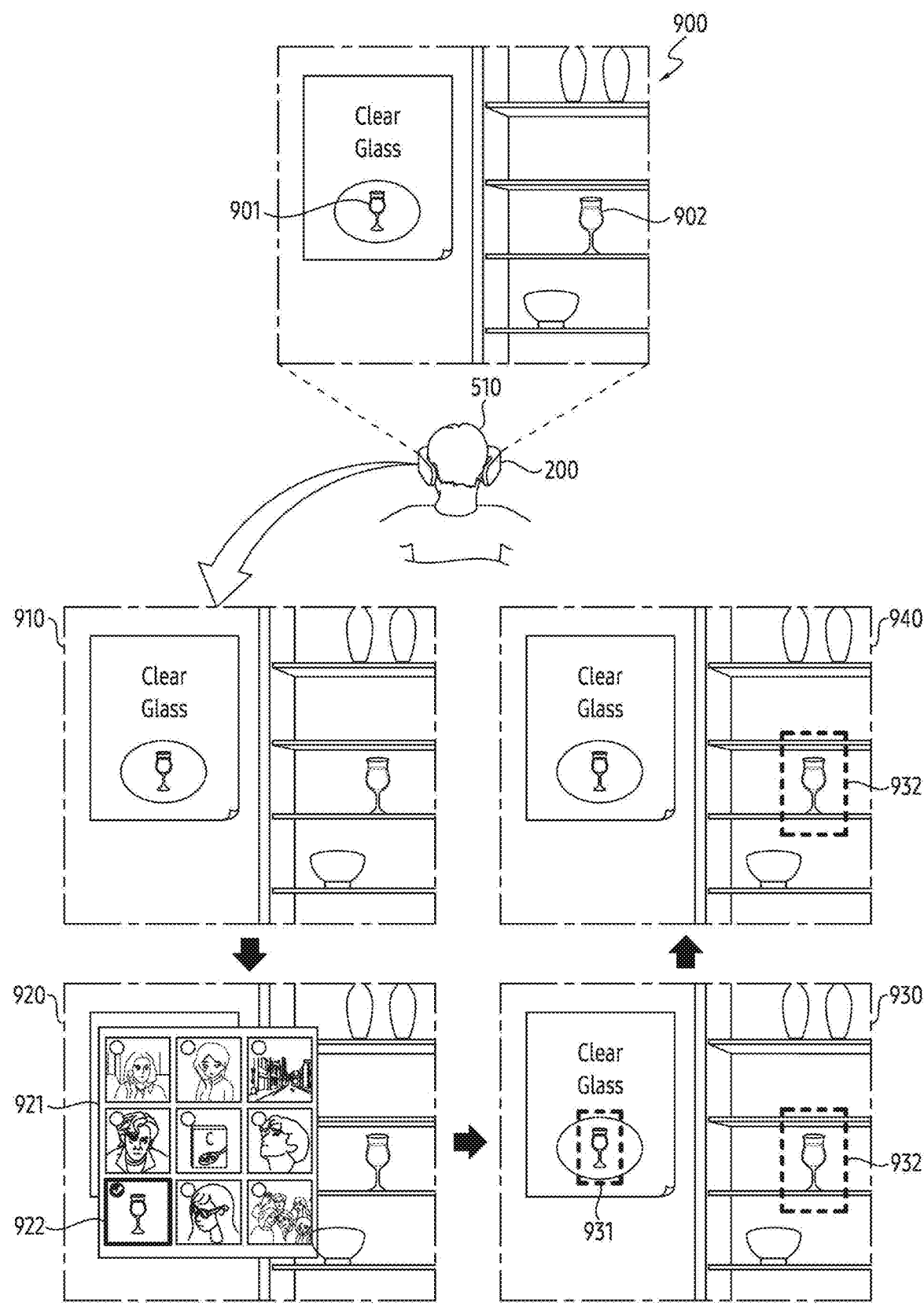
FIG. 9 illustrates an example of an operation of a wearable device, according to an embodiment.

FIG. 9 illustrates an example of an operation of a wearable device, according to an embodiment.

Referring to FIG. 9, a wearable device 200 may be disposed to face an external environment 900. A user 510 of the wearable device 200 may be in a state of looking at the external environment 900. A processor 410 may obtain data on the external environment 900 by using a camera 425. The processor 410 may obtain an image 910 on the external environment 900, based on data on the external environment 900. The processor 410 may display the image 910 through a display 420.

The processor 410 may set a mode of the wearable device 200 to a mode for identifying an external object corresponding to a target object. In the mode for identifying the external object corresponding to the target object, the processor 410 may identify information on the target object. For example, the processor 410 may identify the information on the target object, based on a user input.

For example, the processor 410 may identify a user input for executing a gallery application. Based on the user input, the processor 410 may display an image 920 in which a user interface 921 related to the gallery application is displayed by overlapping the image 910. The processor 410 may identify an input selecting an image 922 related to a target object (e.g., a wine glass) in the user interface 921 related to the gallery application. The processor 410 may identify information on the target object based on the identified input. The processor 410 may identify information on a shape and/or a visual pattern of the target object, based on the image 922 of the target object.

The processor 410 may identify feature points of the image 922 (or the target object) related to the target object. The processor 410 may identify feature points of each of a plurality of visual objects included in the image 910. The processor 410 may set the feature points of each of the plurality of visual objects and the feature points of the image 922 as an input value of a designated model (e.g., the first model 604 or the second model 606 of FIG. 6). Based on an output value of the designated model, the processor 410 may identify a visual object 931 and a visual object 932 related to the external object corresponding to the target object.

For example, each of the visual object 931 and the visual object 932 may be referred to as a candidate visual object. The processor 410 may display an image 930 including the visual object 931 and the visual object 932 which are the candidate visual object. The processor 410 may display an element (e.g., a bounding box) indicating that the visual object 931 and the visual object 932 are the candidate visual object, on the image 930.

The processor 410 may identify information on a size of the target object while the image 930 including the visual object 931 and the visual object 932 which are the candidate visual object is displayed through the display 420. For example, the processor 410 may identify information on a size of the target object based on a user input.

As an example, the processor 410 may identify information on the size of the target object, based on a voice input such as "Find me a wine glass with a height of 20 cm". An external object 901 may be a picture of a wine glass shape in a poster. An external object 902 may be an actual wine glass. A height of the external object 901 may be about 10 cm. A height of the external object 902 may be about 20 cm. The processor 410 may identify the external object 902 corresponding to the target object based on the information on the size of the target object. The processor 410 may display an image 940 emphasizing the visual object 932 with respect to the external object 902.

According to an embodiment, the processor 410 may identify the information on the size of the target object, together with an input selecting an image 922 related to a target object (e.g., a wine glass).

According to an embodiment, the processor 410 may identify candidate visual objects (e.g., the visual object 931 and the visual object 932) similar to the shape and/or visual pattern of the target object, based on a first model included in the designated model. The processor 410 may identify the external object similar to the size of the target object among external objects (e.g., the external object 901 and the external object 902) corresponding to the candidate visual objects (e.g., the visual object 931 and the visual object 932), based on a second model included in the designated model.

As described above, the processor 410 may identify candidate visual objects based on a visual query (or information on a shape and/or a visual pattern of a target object), and identify a visual object related to an external object corresponding to a target object among the candidate visual objects based on additional identified scale information (or information on a size of a target object). The processor 410 may refine the identified result based on the visual query and provide the result to the user. For example, the processor 410 may identify (or estimate) a local depth or 3-dimensional (3D) scale information with respect to the candidate visual object using stereo matching or a time of flight (ToF) sensor, without estimating a depth of at least one image as a whole. The processor 410 may reduce the amount of computation, based on identifying a local depth or 3-dimensional (3D) scale information with respect to the candidate visual object.

Figure 10:
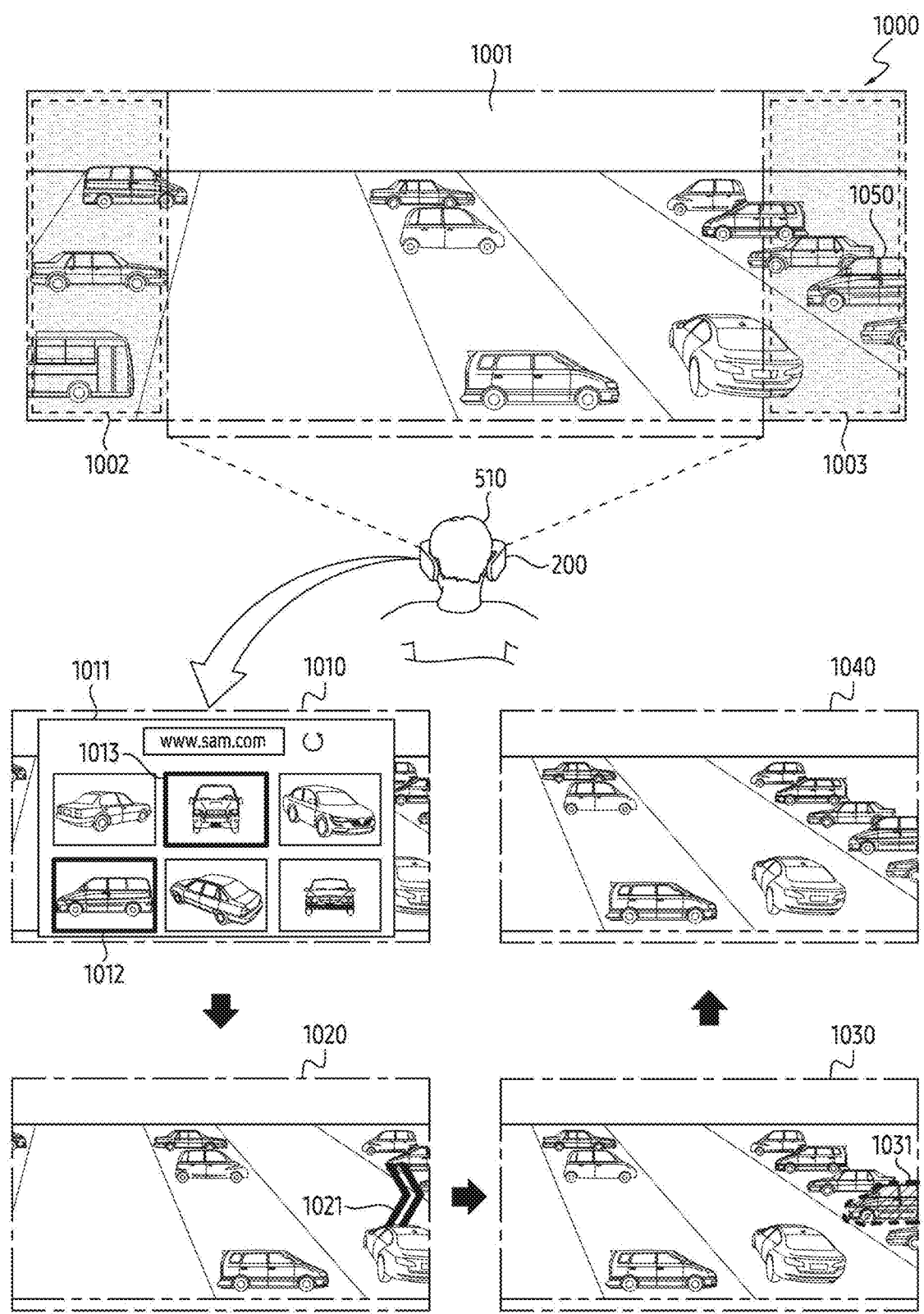
FIG. 10 illustrates an example of an operation of a wearable device, according to an embodiment.

FIG. 10 illustrates an example of an operation of a wearable device, according to an embodiment.

Referring to FIG. 10, a camera 425 of a wearable device 200 may be configured with one or more cameras. For example, the wearable device 200 may include a first camera for constructing an image (or screen) to be displayed through a display 420 and a second camera and a third camera for identifying surroundings of a user 510, although not displayed through the display 420. For example, the second camera and the third camera may be referred to as a supplementary side-facing camera. Hereinafter, for convenience of explanation, an example in which the camera 425 includes first to third cameras will be described, but it is not limited thereto. For example, the camera 425 may be configured with a wide angle camera.

For example, the processor 410 may obtain data on a first portion 1001 of an external environment 1000 by using a first camera. Based on data on the first portion 1001 of the external environment 1000, the processor 410 may display an image (not shown) corresponding to the first portion 1001 of the external environment 1000 on the display 420. For example, while the data on the first portion 1001 of the external environment 1000 is obtained using the first camera, the processor 410 may obtain data on a second portion 1002 of the external environment 1000 using a second camera, and obtain data on a third portion 1003 of the external environment 1000 using a third camera. The processor 410 may obtain an image corresponding to the second portion 1002 of the external environment 1000, based on the data on the second portion 1002 of the external environment 1000. The processor 410 may obtain an image corresponding to the third portion 1003 of the external environment 1000, based on the data on the third portion 1003 of the external environment 1000.

While displaying the image (not shown) corresponding to the first portion 1001 of the external environment 1000 on the display 420, the processor 410 may store the image corresponding to the second portion 1002 of the external environment 1000 and the image corresponding to the third portion 1003 of the external environment 1000, in a memory 415. For example, since the image corresponding to the second portion 1002 of the external environment 1000 and the image corresponding to the third portion 1003 of the external environment 1000 are not displayed on the display 420, rendering may not be performed on the image corresponding to the second portion 1002 of the external environment 1000 and the image corresponding to the third portion 1003 of the external environment 1000.

According to an embodiment, the processor 410 may set a mode of the wearable device 200 to a mode for identifying an external object corresponding to a target object. In the mode for identifying an external object corresponding to a target object, the processor 410 may identify information on the target object. For example, the processor 410 may identify information on the target object based on a user input.

For example, the processor 410 may perform a search for the target object through a network based on a user input (e.g., voice input, keyboard input). The processor 410 may display the image 1010 in which a user interface 1011 including a plurality of images according to a search result is displayed by overlapping an image (not shown) corresponding to the first portion 1001 of the external environment 1000.

The processor 410 may identify a user input for selecting at least one target image related to the target object from among a plurality of images displayed in the user interface 1011. The processor 410 may identify the at least one target image related to the target object from among the plurality of images displayed in the user interface 1011. For example, the at least one target image may include an image 1012 and an image 1013.

The processor 410 may identify information on the target object, based on the at least one target image (e.g., the image 1012 and the image 1013). The processor 410 may identify information on a shape and/or a visual pattern of the target object based on the at least one target image.

According to an embodiment, when an input for selecting one target image is received from the user 510, the processor 410 may perform an image search based on the one target image. The processor 410 may obtain images of the target object viewed from various directions through a network. The processor 410 may identify a designated number of images from among images viewed from various directions, based on similarity. According to the similarity, the processor 410 may set a weight for each of the designated number of images. The processor 410 may identify a visual object related to an external object corresponding to the target object, based on the weight. According to the above embodiment, the processor 410 may identify a visual object indicating a rear side of a designated vehicle within images obtained through the camera 425, based on identifying an image for a front side of the designated vehicle.

According to an embodiment, the processor 410 may identify the visual object related to the external object corresponding to the target object in the images obtained through the camera 425, based on the at least one target image. For example, the processor 410 may identify the visual object related to the external object corresponding to the target object, within an image corresponding to the first portion 1001 of the external environment 1000, an image corresponding to the second portion 1002 of the external environment 1000, and an image corresponding to the third portion 1003 of the external environment 1000.

The processor 410 may identify that the external object 1050 corresponding to the target object is included in the third portion 1003 of the external environment 1000. For example, based on identifying a visual object (e.g., a visual object 1031 in an image 1030) related to an external object 1050 corresponding to the target object in an image corresponding to the third portion 1003 of the external environment 1000, the processor 410 may identify that the external object 1050 corresponding to the target object is included in the third portion 1003 of the external environment 1000. The processor 410 may display an image 1020 on which an affordance 1021 for guiding an image and the gaze of the user 510 corresponding to the first portion 1001 of the external environment 1000 to change toward the third portion 1003 of the external environment 1000 are displayed, through the display 420.

The processor 410 may display an image 1030 including a visual object 1031 related to the external object 1050 corresponding to the target object through the display 420, based on identifying that the gaze of the user 510 is changed toward the third portion 1003 of the external environment 1000. In the image 1030, the visual object 1031 may be emphasized. For example, the processor 410 may remove a color of a remaining area except for an area corresponding to the visual object 1031. The processor 410 may maintain a color of the area corresponding to the visual object 1031, and display the color of the remaining area based on grayscale.

The processor 410 may identify a user input for terminating the mode for identifying the external object corresponding to the target object, while the image 1030 is displayed through the display 420. For example, the user input may include a designated motion (e.g., eye movement, hand movement, movement of controller connected to the wearable device 200) input and a designated voice input.

Based on the user input, the processor 410 may change an image displayed through the display 420 from the image 1030 to an image 1040. The processor 410 may change the image displayed through the display 420 from the image 1030 to the image 1040, by ceasing emphasizing the visual object 1031.

According to an embodiment, while the wearable device 200 operates in the mode for identifying the external object corresponding to the target object, according to the movement of the user 510, the processor 410 may identify additional images, regardless of whether the external object corresponding to the target object is identified. The processor 410 may emphasize the visual object, based on that the visual object related to the external object corresponding to the target object is identified in the additional images.

According to an embodiment, a first area of the external environment identified through the camera 425 may be set to be larger than a second area of the external environment displayed through the display 420. For example, the camera 425 may identify a plurality of surrounding areas of the wearable device 200. Even when the visual object related to the external object corresponding to the target object is not displayed in an image displayed through the display 420, the processor 410 may identify the external object corresponding to the target object in an area around the wearable device 200. The processor 410 may provide an affordance as a prompt or instructions so that the gaze of the user 510 faces the external object when following the affordance. According to an embodiment, the processor 410 may obtain information (e.g., a spatial map) on an external environment in which the wearable device 200 is located, from an external electronic device (e.g., external wearable device, server). The processor 410 may identify the external object corresponding to the target object in the external environment, based on the information on the external environment.

Figure 11:
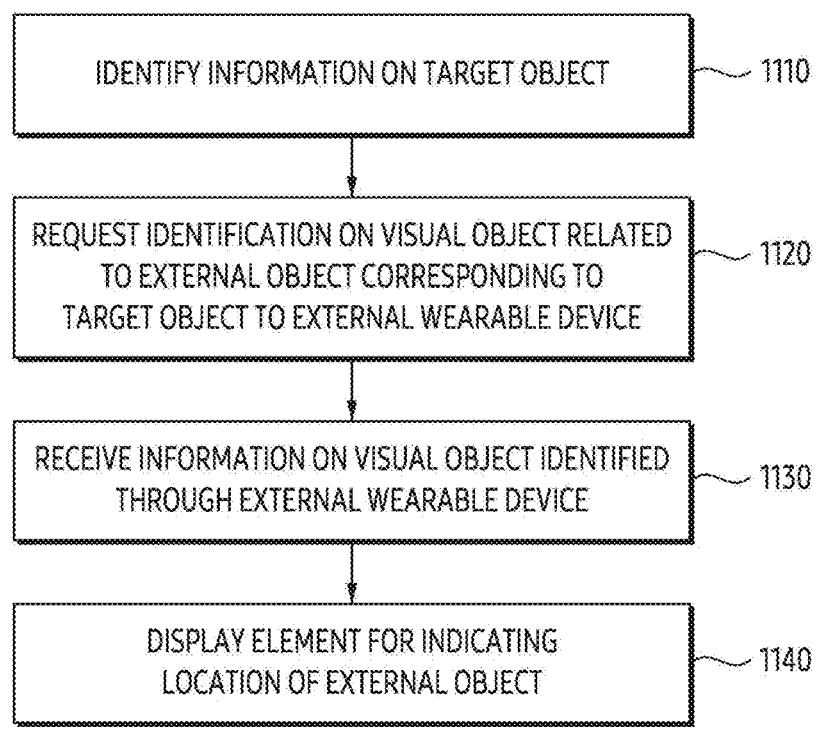
FIG. 11 is a flowchart illustrating an operation of a wearable device, according to an embodiment.

FIG. 11 is a flowchart illustrating an operation of a wearable device, according to an embodiment. In the following embodiment, each operation may be performed sequentially, but is not necessarily performed sequentially. For example, a sequence of each operation may be changed, and at least two operations may be performed in parallel.

Referring to FIG. 11, a wearable device 200 may identify another wearable device (hereinafter, an external wearable device) connected (e.g., via communication) to the wearable device 200. According to an embodiment, the wearable device 200 may identify an external wearable device located within a designated distance from the wearable device 200. According to an embodiment, the wearable device 200 may identify an external wearable device located in the same space (e.g., a house or a market) as the wearable device 200. According to an embodiment, the wearable device 200 may identify an external wearable device located in a FoV of a camera 425 of the wearable device 200. For example, the processor 410 may establish a connection with the external wearable device. The processor 410 may perform operations 1110 to 1140 while the connection with the external wearable device is established.

In operation 1110, the processor 410 may identify information on a target object. For example, the processor 410 may identify the information on the target object within a mode for identifying an external object corresponding to the target object. Operation 1110 may correspond to operation 710 of FIG. 7.

In operation 1120, the processor 410 may request identification of a visual object related to the external object corresponding to the target object to the external wearable device. For example, the processor 410 may request the identification of the visual object related to the external object, based on transmitting the information on the target object to the external wearable device. For example, the information on the target object may include information on a shape and/or a visual pattern of the target object and/or information on a size of the target object. For example, the processor 410 may transmit a query related to the information on the target object to the external wearable device.

The external wearable device may identify the external object related to the target object, based on the information on the target object received from the wearable device 200. For example, the external wearable device may identify the visual object related to the external object corresponding to the target object in at least one image obtained from the external wearable device, based on operation 720 illustrated in FIG. 7.

For example, the external wearable device may accumulate and store information on SLAM in a memory of the external wearable device. The external wearable device may accumulate and store the information on SLAM, which is changed over time, in the memory. The external wearable device may identify the visual object related to the external object corresponding to the target object, based on the information on the SLAM stored in the memory. The external wearable device may identify a time at which the visual object was identified (e.g., 3 seconds before, now, and a specific time) together, based on the information on the SLAM.

In operation 1130, the processor 410 may receive information on the identified visual object through the external wearable device. For example, the information on the visual object may include at least one of information on a location of the external object or information on a time at which the visual object was identified. The information on the location of the external object may include information on a 3D space location of the external object. For example, the information on the time at which the visual object was identified may include information on a time (or timing) at which the visual object was identified within information on the SLAM identified during a designated time interval according to a user's gaze change (or movement) of the external wearable device. The processor 410 may identify a time at which the external object was photographed through a camera of the external wearable device in the external wearable device, based on information on a time at which the visual object was identified.

The external wearable device may identify the 3D space location of the external object on a spatial map identified by the external wearable device. The processor 410 may transmit the information on the 3D space location of the external object to the wearable device 200. For example, the information on the 3D space location may be composed of coordinate set based on the external wearable device. The external wearable device may transmit information on a location relationship between the external wearable device and the wearable device 200 and the information on the 3D space location to the wearable device 200.

For example, the information on the 3D space location may be configured with fixed coordinates (e.g., world coordinate) set within a space including the wearable device 200 and the external wearable device.

According to an embodiment, the processor 410 may identify the information on the external space including a first location where the wearable device 200 is located and a second location where the external wearable device is located, based on the information on the visual object. For example, the processor 410 may identify a spatial map related to an external space including the first location where the wearable device 200 is located and the second location where the external wearable device is located, based on the information on the visual object. The processor 410 may identify the location of the external object within the spatial map related to the external space. The processor 410 may identify the location of the external object as a third location, within the spatial map related to the external space.

In operation 1140, the processor 410 may display an element for indicating the location of the external object. For example, the processor 410 may identify a path from the first location where the wearable device 200 is located to the third location identified as the location of the external object, based on the information on the location of the external object. The processor 410 may display an element for indicating the location of the external object, based on the identified path. For example, the processor 410 may display a spatial map related to the external space through the display 420. The processor 410 may display the path from the first location to the third location on the spatial map. For example, the processor 410 may display a 2D map based on the spatial map. The processor 410 may display the path from the first location to the third location on the 2D map. For example, the processor 410 may display a direction and a distance from the first location to the third location.

In operations 1110 to 1140, an operation of receiving information on the visual object from one external wearable device is described, but is not limited thereto. The processor 410 may transmit information on the target object to a plurality of external electronic devices. The processor 410 may receive information on the visual object from each of the plurality of external electronic devices.

Figure 12A:
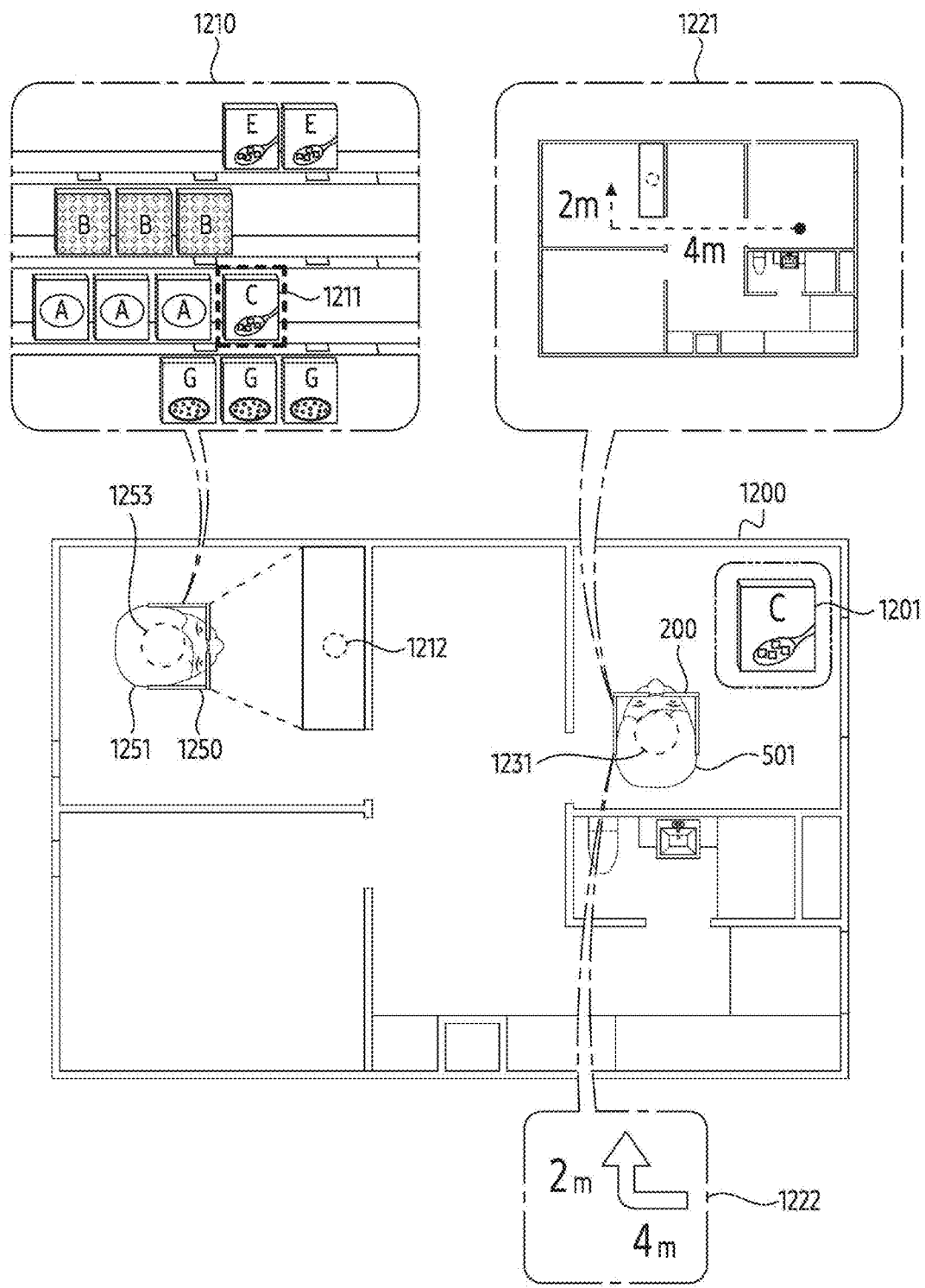
FIG. 12A illustrates an example of an operation of a wearable device for identifying an external object corresponding to a target object through an external wearable device, according to an embodiment.

FIG. 12A illustrates an example of an operation of a wearable device for identifying an external object corresponding to a target object through an external wearable device, according to an embodiment.

Figure 12B:
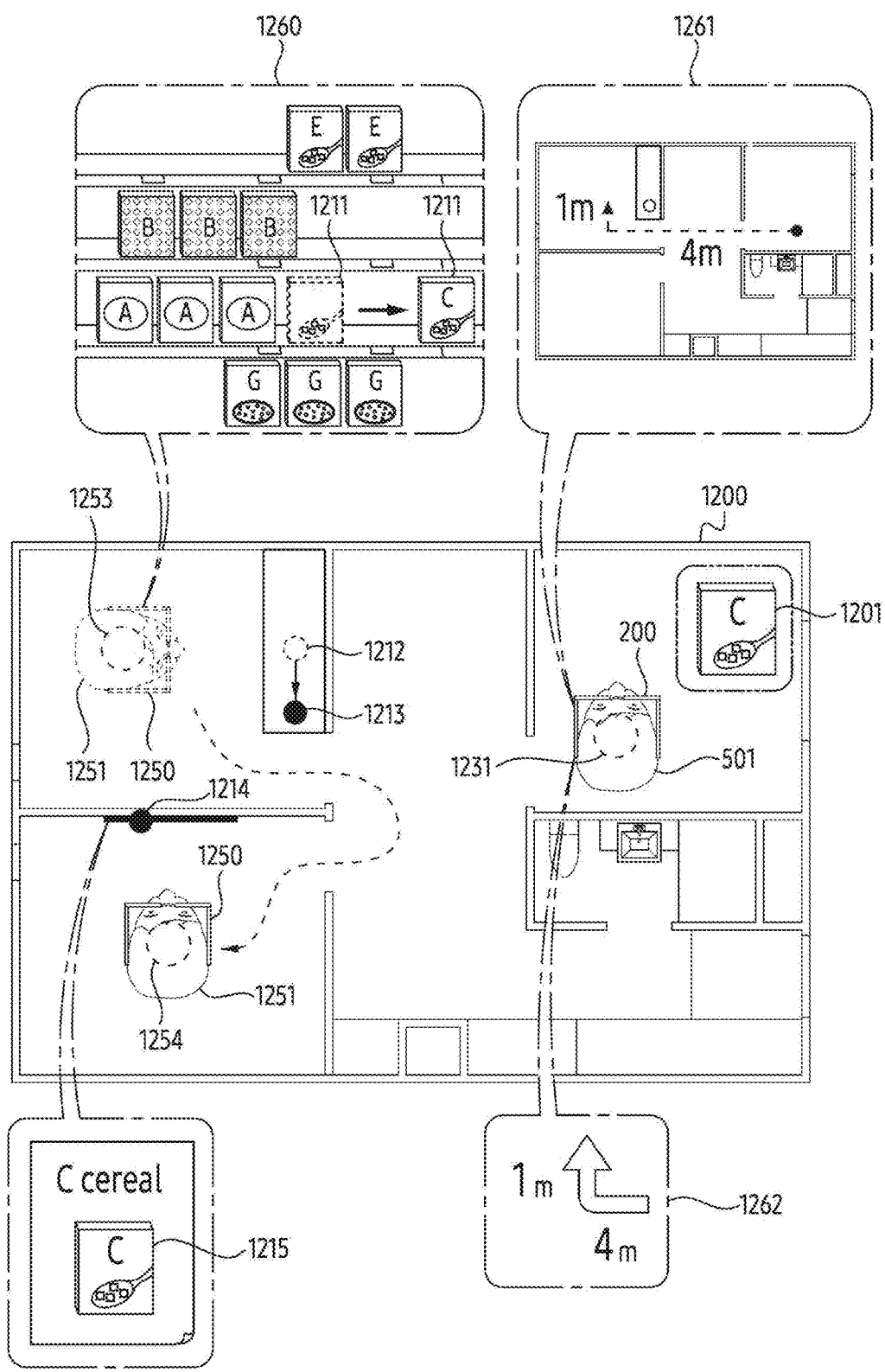
FIG. 12B illustrates an example of an operation of a wearable device for identifying an external object corresponding to a target object through an external wearable device, according to an embodiment.

FIG. 12B illustrates an example of an operation of a wearable device for identifying an external object corresponding to a target object through an external wearable device, according to an embodiment.

Referring to FIG. 12A, a processor 410 may identify information on a target object 1201. For example, the processor 410 may obtain information (e.g., a target image) on the target object 1201, based on a search for the target object 1201 through a network. For example, the processor 410 may obtain the information on the target object 1201 from an external electronic device. For example, the processor 410 may obtain the information on the target object 1201 based on a user input for selecting at least one of a plurality of images displayed on a gallery application. The processor 410 may identify the information on the target object 1201 stored in a memory 415 (or cloud).

The processor 410 may transmit information on the target object 1201 to an external wearable device 1250. Based on transmitting the information on the target object 1201 to the external wearable device 1250, the processor 410 may request identification (or search) of a visual object corresponding to the target object 1201. The processor 410 may request to identify whether a visual object related to the external object corresponding to the target object 1201 is included in at least one image identified by the external wearable device 1250 during a designated time.

The external wearable device 1250 may be used by a user 1251 distinguished from a user 510 of the wearable device 200. The external wearable device 1250 may identify an external object related to the target object, based on the information on the target object 1201. The external wearable device 1250 may identify a visual object related to the external object corresponding to the target object 1201 in at least one image obtained through a camera of the external wearable device 1250.

For example, the external wearable device 1250 may identify a visual object 1211 related to the external object corresponding to the target object 1201 within an image 1210. The external wearable device 1250 may identify a location of the external object. The external wearable device 1250 may identify a location of the external object as a location 1212.

The external wearable device 1250 may transmit information on the visual object 1211 to the wearable device 200. For example, the information on the visual object may include at least one of information on a location of the external object or information on a time at which the visual object 1211 was identified. For example, the information on the location of the external object may include information on a 3D space location of the external object. The external wearable device 1250 may identify the information on the 3D space location of the external object, on a spatial map related to an external space 1200. The external wearable device 1250 may transmit the information on the 3D space location of the external object to the wearable device 200. As an example, the external wearable device 1250 may identify the location of the external object as the location 1212. The external wearable device 1250 may transmit the information on the location 1212 to the wearable device 200.

The processor 410 may receive the information on the visual object 1211 from the external wearable device 1250. The processor 410 may identify the location of the external object as the location 1212, based on the information on the visual object 1211. The processor 410 may identify a time at which the external object was identified, based on the information on the visual object 1211.

According to an embodiment, the processor 410 may display at least one of an image 1221 and an image 1222 on the display 420, based on the information on the visual object 1211.

For example, based on the information on the visual object 1211, the processor 410 may identify information on an external space 1200 including a location 1231 where the wearable device 200 is located and a location 1253 where the external wearable device 1250 is located. The processor 410 may identify a path from the location 1231 of the wearable device 200 to the location 1212 of the external object. The processor 410 may display the image 1221 indicating the path from the location 1231 of the wearable device 200 to the location 1212 of the external object within a 2D map corresponding to the external space 1200, through the display 420.

For example, the processor 410 may identify information on a distance and direction from the location 1231 of the wearable device 200 to the location 1212 of the external object, based on the information on the visual object 1211. The processor 410 may display the image 1222 indicating the information on the distance and direction from the location 1231 of the wearable device 200 to the location 1212 of the external object through the display 420.

Although not illustrated, according to an embodiment, the processor 410 may simultaneously display the image 1221 and the image 1222 through the display 420. According to an embodiment, the processor 410 may display information on the external wearable device 1250 identifying the external object and information on the location of the external wearable device 1250, through the display 420.

Referring to FIG. 12B, the processor 410 may the identify information on the target object 1201. For example, the processor 410 may obtain information (e.g., a target image) on the target object 1201, based on a search for the target object 1201 through a network.

The processor 410 may transmit information on the target object 1201 to the external wearable device 1250. Based on transmitting the information on the target object 1201 to the external wearable device 1250, the processor 410 may request identification (or search) of a visual object related to the external object corresponding to the target object 1201. For example, the processor 410 may identify (or set) a time interval for identifying the visual object related to the external object corresponding to the target object 1201. The processor 410 may transmit information on the identified time interval to the external wearable device 1250.

The external wearable device 1250 may identify the external object related to the target object 1201 based on the information on the target object 1201. For example, the external wearable device 1250 may identify at least one image obtained using a camera during a designated time interval. The external wearable device 1250 may identify (or obtain, generate) a spatial map based on at least one image obtained during the designated time interval.

For example, while the external wearable device 1250 is located at the location 1253, the external wearable device 1250 may identify the visual object 1211 based on the image obtained at a first timing in the designated time interval. The external wearable device 1250 may identify that an external object corresponding to the visual object 1211 is located at the location 1212 in the external space 1200 at the first timing. While the external wearable device 1250 is located at the location 1253, the external wearable device 1250 may identify the visual object 1211 based on an image 1260 obtained at a second timing in the designated time interval. The external wearable device 1250 may identify that the external object corresponding to the visual object 1211 is located at a location 1213 in the external space 1200 in the second timing. Based on identifying that the visual object 1211 is moved, the external wearable device 1250 may identify that a location of the external object corresponding to the visual object 1211 has been changed from the location 1212 to the location 1213.

While the external wearable device 1250 is located at a location 1254, the external wearable device 1250 may identify the visual object 1215, based on an image obtained at a third timing in the designated time interval. The external wearable device 1250 may identify that another external object corresponding to the visual object 1215 is located at a location 1214 in the external space 1200 at the third timing. For example, a shape or visual pattern of the other external object corresponding to the visual object 1215 may be the same as or similar to a shape or visual pattern of the external object corresponding to the visual object 1211. A size of the other external object corresponding to the visual object 1215 may be different from a size of the external object corresponding to the visual object 1211. As an example, the other external object may be a picture of the external object. As an example, the other external object may be a miniature of the external object.

The external wearable device 1250 may identify a spatial map, based on at least one image obtained during the designated time interval. For example, the external wearable device 1250 may identify the spatial map, based on information indicating that the external object is located at the location 1213 at the second timing and information indicating that the other external object is located at the location 1214 at the third timing.

The external wearable device 1250 may identify the visual object 1211 related to the external object corresponding to the target object 1201, based on receiving information on the target object 1201 from the wearable device 200. For example, the external wearable device 1250 may identify the visual object 1211 and the visual object 1215 as candidate visual objects, based on information on a shape and/or a visual pattern of the target object 1201. The external wearable device 1250 may identify the visual object 1211 related to the external object corresponding to the target object 1201 among the candidate visual objects, based on information on a size of the target object 1201.

The processor 410 may receive information on the visual object 1211 from the external wearable device 1250. The processor 410 may identify a location of the external object as the location 1213, based on the information on the visual object 1211. The processor 410 may identify the second timing in which the external object is identified, based on the information on the visual object 1211.

According to an embodiment, the processor 410 may display at least one of an image 1261 and an image 1262 through the display 420, based on the information on the visual object 1211.

For example, based on the information on the visual object 1211, the processor 410 may identify information on the external space 1200 including the location 1231 where the wearable device 200 is located and the location 1254 where the external wearable device is located. The processor 410 may identify a path from the location 1231 of the wearable device 200 to the location 1213 of the external object. The processor 410 may display the image 1261 indicating the path from the location 1231 of the wearable device 200 to the location 1213 of the external object through the display 420 within a 2D map corresponding to the external space 1200.

For example, the processor 410 may identify information on a distance and a direction from the location 1231 of the wearable device 200 to the location 1213 of the external object, based on the information on the visual object 1211. The processor 410 may display the image 1262 indicating the information on the distance and the direction from the location 1231 of the wearable device 200 to the location 1213 of the external object through the display 420.

Although not illustrated, according to an embodiment, the processor 410 may simultaneously display the image 1261 and the image 1262 through the display 420. According to an embodiment, the processor 410 may display the information on the external wearable device 1250 identifying the external object and information on the location of the external wearable device 1250 through the display 420.

According to an embodiment, a wearable device (e.g., wearable device 200) may include a display (e.g., display 420), one or more cameras (e.g., camera 425), memory (e.g., memory 415) including one or more storage mediums storing instructions, and at least one processor (e.g., processor 410) comprising processing circuitry. The instructions, when being executed by the at least one processor individually or collectively, may cause the wearable device to identify information on a target object. The instructions, when being executed by the at least one processor individually or collectively, may cause the wearable device to identify a visual object related to an external object corresponding to the target object in at least one image acquired by the one or more cameras and obtained based on a gaze of a user of the wearable device during a designated time interval. The instructions, when being executed by the at least one processor individually or collectively, may cause the wearable device to identify whether a first image including the visual object is displayed through the display based on the gaze of the user. The instructions, when being executed by the at least one processor individually or collectively, may cause the wearable device to change the first image to emphasize the visual object, based on identifying that the first image including the visual object is displayed through the display. The instructions, when being executed by the at least one processor individually or collectively, may cause the wearable device to display an affordance for changing the gaze of the user to display the first image by overlapping the second image, based on identifying that a second image, which is distinct from the first image including the visual object, is displayed through the display.

According to an embodiment, the information on the target object may comprise information on a shape and/or a visual pattern of the target object and information on a size of the target object. The instructions, when being executed by the at least one processor individually or collectively, may cause the wearable device to identify one or more candidate visual objects corresponding to the target object based on the information on the shape and/or the visual pattern of the target object. The instructions, when being executed by the at least one processor individually or collectively, may cause the wearable device to identify the visual object among the one or more candidate visual objects, based on the information on the size of the target object.

According to an embodiment, the instructions, when being executed by the at least one processor individually or collectively, may cause the wearable device to identify at least one target image related to the target object. The instructions, when being executed by the at least one processor individually or collectively, may cause the wearable device to identify, based on the at least one target image, the information on the shape and/or visual pattern of the target object.

According to an embodiment, the instructions, when being executed by the at least one processor individually or collectively, may cause the wearable device to identify, based on a user input, the information on the size of the target object.

According to an embodiment, the instructions, when being executed by the at least one processor individually or collectively, may cause the wearable device to change a display of a remaining area other than an area corresponding to the visual object in the first image, based on identifying that the first image including the visual object is displayed through the display.

According to an embodiment, the instructions, when being executed by the at least one processor individually or collectively, may cause the wearable device to display information on a distance between the external object and the wearable device in association with the visual object.

According to an embodiment, the instructions, when being executed by the at least one processor individually or collectively, may cause the wearable device to store the information on the plurality of visual objects in the memory, based on obtaining information on a plurality of visual objects included in the at least one image. The instructions, when being executed by the at least one processor individually or collectively, may cause the wearable device to set the information on the plurality of visual objects and the information on the target object as an input value of a designated model indicated by a plurality of parameters. The instructions, when being executed by the at least one processor individually or collectively, may cause the wearable device to identify the visual object related to the external object corresponding to the target object in the at least one image, based on output values of the designated model.

According to an embodiment, the instructions, when being executed by the at least one processor individually or collectively, may cause the wearable device to obtain an image of an external environment including the first image and the second image using the one or more cameras. The instructions, when being executed by the at least one processor individually or collectively, may cause the wearable device to display one of the first image and the second image through the display, based on a portion of the image of the external environment.

According to an embodiment, the instructions, when being executed by the at least one processor individually or collectively, may cause the wearable device to request identification of the visual object to an external wearable device connected to the wearable device. The instructions, when being executed by the at least one processor individually or collectively, may cause the wearable device to receive information on the visual object identified through the external wearable device based on the request. The instructions, when being executed by the at least one processor individually or collectively, may cause the wearable device to display an element for indicating a location of the external object, based on the information on the visual object.

According to an embodiment, the information on the visual object may comprise at least one of information on the location of the external object or information on a time at which the visual object was identified.

According to an embodiment, the instructions, when being executed by the at least one processor individually or collectively, may cause the wearable device to identify a spatial map of an external space including a first location where the wearable device is located and a second location where the external wearable device is located, based on the information on the visual object. The instructions, when being executed by the at least one processor individually or collectively, may cause the wearable device to identify a location of the external object as a third location in the spatial map.

According to an embodiment, the instructions, when being executed by the at least one processor individually or collectively, may cause the wearable device to identify a path from the first location where the wearable device is located to the third location identified as the location of the external object based on the location information of the external object. The instructions, when being executed by the at least one processor individually or collectively, may cause the wearable device to display the element for indicating the location of the external object, based on the identified path.

According to an embodiment, the instructions, when being executed by the at least one processor individually or collectively, may cause the wearable device to obtain a spatial map of the external object based on the at least one image. The instructions, when being executed by the at least one processor individually or collectively, may cause the wearable device to identify the visual object related to the external object, based on the spatial map.

According to an embodiment, a method of a wearable device may comprise identifying information on a target object. The method may comprise identifying a visual object related to an external object corresponding to the target object in at least one image obtained based on a gaze of a user of the wearable device during a designated time interval. The method may comprise identifying whether a first image including the visual object is displayed through a display of the wearable device based on the gaze of the user. The method may comprise, based on identifying that the first image including the visual object is displayed through the display, changing the first image to emphasize the visual object. The method may comprise, based on identifying that a second image, which is distinct from the first image including the visual object, is displayed through the display, displaying an affordance for changing the gaze of the user to display the first image by overlapping the second image.

According to an embodiment, the information on the target object may comprise information on a shape and/or a visual pattern of the target object and information on a size of the target object. The method may comprise identifying one or more candidate visual objects corresponding to the target object based on the information on the shape and/or visual pattern of the target object. The method may comprise, based on the information on the size of the target object, identifying the visual object among the one or more candidate visual objects.

According to an embodiment, the method may comprise identifying at least one target image related to the target object. The method may comprise identifying, based on the at least one target image, the information on the shape and/or visual pattern of the target object.

According to an embodiment, the method may comprise requesting identification of the visual object to an external wearable device connected to the wearable device. The method may comprise receiving information on the visual object identified through the external wearable device based on the request. The method may comprise, based on the information on the visual object, displaying an element for indicating a location of the external object.

According to an embodiment, the information on the visual object may comprise at least one of information on the location of the external object or information on a time at which the visual object was identified.

According to an embodiment, the method may comprise identifying a spatial map of an external space including a first location where the wearable device is located and a second location where the external wearable device is located, based on the information on the visual object. The method may comprise identifying a location of the external object as a third location in the spatial map.

According to an embodiment, the method may comprise identifying a path from the first location where the wearable device is located to the third location identified as the location of the external object based on the location information of the external object. The method may comprise, based on the identified path, displaying the element for indicating the location of the external object.

The above-described terms such as 'unit' and/or 'module' refer to a unit that processes at least one function or operation, which may be implemented as hardware or software, or a combination thereof.

According to the above-described embodiment, a wearable device may identify an external object corresponding to a target object in a real environment, based on information on a shape and/or a visual pattern of the target object and information on a size of the target object. The wearable device may emphasize and display a visual object related to the identified external object.

Based on identifying a plurality of visual objects in at least one image by using at least one image obtained during a designated time interval, the wearable device may identify a plurality of external objects corresponding to the plurality of visual objects and a location of each of the plurality of external objects during the designated time interval. The wearable device may identify an external object corresponding to the target object among the plurality of external objects. The wearable device may identify a location of the external object corresponding to the target object. The wearable device may guide movement to the location of the external object corresponding to the target object.

In order to identify the external object corresponding to the target object among the plurality of external objects, the wearable device may primarily identify candidate visual objects based on information on a shape and/or a visual pattern of the target object. The wearable device may secondarily identify a visual object related to the external object corresponding to the target object among the candidate visual objects, based on information on a size of the target object. The wearable device identifies an external object corresponding to the size of the target object based on depth information on the candidate visual objects obtained using a ToF sensor (or a plurality of cameras), thereby identifying the visual object related to the external object corresponding to the target object.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. A wearable device comprising:
   a display;
   one or more cameras configured to obtain images related to external environment of the wearable device;
   memory including one or more storage mediums storing instructions; and
   at least one processor comprising processing circuitry,
   wherein the instructions, when being executed by the at least one processor individually or collectively, cause the wearable device to:
   identify information on a target object at a reference timing;
   identify a visual object related to an external object corresponding to the target object in at least one image acquired by the one or more cameras and obtained based on movement of a user of the wearable device during a designated time interval before the reference timing;
   identify whether a screen displayed through the display includes the visual object, wherein the screen is obtained based on a field of view (FoV) of the user;
   based on identifying that the screen includes the visual object, emphasize the visual object on the screen; and
   based on identifying that the screen does not include the visual object, display an affordance on the screen for changing the FoV of the user to display the visual object on the screen.

2. The wearable device of claim 1, wherein the information on the target object comprises information on a shape and/or a visual pattern of the target object and information on a size of the target object,
   wherein the instructions, when being executed by the at least one processor individually or collectively, cause the wearable device to:
   identify one or more candidate visual objects corresponding to the target object based on the information on the shape and/or the visual pattern of the target object; and
   based on the information on the size of the target object, identify the visual object among the one or more candidate visual objects.

3. The wearable device of claim 2, wherein the instructions, when being executed by the at least one processor individually or collectively, cause the wearable device to:
   identify at least one target image related to the target object; and identify, based on the at least one target image, the information on the shape and/or the visual pattern of the target object.

4. The wearable device of claim 3, wherein the instructions, when being executed by the at least one processor individually or collectively, cause the wearable device to identify, based on a user input, the information on the size of the target object.

5. The wearable device of claim 1, wherein the instructions, when being executed by the at least one processor individually or collectively, cause the wearable device to, based on identifying that the screen includes the visual object, change a remaining area, other than an area corresponding to the visual object on the screen, to emphasize the visual object.

6. The wearable device of claim 5, wherein the instructions, when being executed by the at least one processor individually or collectively, cause the wearable device to display information on a distance between the external object and the wearable device in association with the visual object.

7. The wearable device of claim 1, wherein the instructions, when being executed by the at least one processor individually or collectively, cause the wearable device to:
based on obtaining information on a plurality of visual objects included in the at least one image, store the information on the plurality of visual objects in the memory;
set the information on the plurality of visual objects and the information on the target object as an input value of a designated model indicated by a plurality of parameters; and
based on an output value of the designated model, identify the visual object related to the external object corresponding to the target object in the at least one image.

8. The wearable device of claim 1, wherein the instructions, when being executed by the at least one processor individually or collectively, cause the wearable device to:
obtain an image of the external environment including the visual object using the one or more cameras; and
display a portion of the image of the external environment as the screen.

9. The wearable device of claim 1, wherein the instructions, when being executed by the at least one processor individually or collectively, cause the wearable device to:
request identification of the visual object to an external wearable device connected to the wearable device;
receive information on the visual object identified through the external wearable device based on the request; and
based on the information on the visual object, display an element for indicating a location of the external object.

10. The wearable device of claim 9, wherein the information on the visual object comprises at least one of information on the location of the external object or information on a time at which the visual object was identified.

11. The wearable device of claim 10, wherein the instructions, when being executed by the at least one processor individually or collectively, cause the wearable device to:
identify a spatial map of an external space including a first location where the wearable device is located and a second location where the external wearable device is located, based on the information on the visual object; and
identify a location of the external object as a third location in the spatial map.

12. The wearable device of claim 11, wherein the instructions, when being executed by the at least one processor individually or collectively, cause the wearable device to:
identify a path from the first location where the wearable device is located to the third location identified as the location of the external object based on the location information of the external object; and
based on the identified path, display the element for indicating the location of the external object.

13. The wearable device of claim 1, wherein the instructions, when being executed by the at least one processor individually or collectively, cause the wearable device to:
obtain a spatial map of the external object based on the at least one image; and
based on the spatial map, identify the visual object related to the external object.

14. A method performed by a wearable device comprising:
identifying information on a target object at a reference timing;
identifying a visual object related to an external object corresponding to the target object in at least one image obtained based on movement of a user of the wearable device during a designated time interval before the reference timing;
identifying whether a screen displayed through a display of the wearable device includes a visual object, wherein the screen is obtained based on a field of view (FoV) of the user;
based on identifying that the screen includes the visual object, emphasize the visual object on the screen; and
based on identifying that the screen does not include the visual object, displaying an affordance on the screen for changing the FoV of the user to display the visual object on the screen.

15. The method of claim 14, wherein the information on the target object comprises information on a shape and/or a visual pattern of the target object and information on a size of the target object,
wherein the method further comprises:
identifying one or more candidate visual objects corresponding to the target object based on the information on the shape and/or the visual pattern of the target object, and
based on the information on the size of the target object, identifying the visual object among the one or more candidate visual objects.

16. The method of claim 15, wherein the method further comprises:
identifying at least one target image related to the target object; and
identifying, based on the at least one target image, the information on the shape and/or the visual pattern of the target object.

17. The method of claim 14, wherein the method further comprises:
requesting identification of the visual object to an external wearable device connected to the wearable device;
receiving information on the visual object identified through the external wearable device based on the request; and
based on the information on the visual object, displaying an element for indicating a location of the external object.

18. The method of claim 17, wherein the information on the visual object comprises at least one of information on the location of the external object or information on a time at which the visual object was identified, and the method further comprises:
- identifying a spatial map of an external space including a first location where the wearable device is located and a second location where the external wearable device is located, based on the information on the visual object; and
- identifying a location of the external object as a third location in the spatial map.

19. The method of claim 18, wherein the method further comprises:
- identifying a path from the first location where the wearable device is located to the third location identified as the location of the external object based on the location information of the external object; and
- based on the identified path, displaying the element for indicating the location of the external object.

* * * * *